US012512285B2

(12) United States Patent
Ito et al.

(10) Patent No.: US 12,512,285 B2
(45) Date of Patent: Dec. 30, 2025

(54) BREAKER DEVICE

(71) Applicant: Panasonic Intellectual Property Management Co., Ltd., Osaka (JP)

(72) Inventors: Shun Ito, Hyogo (JP); Shinya Kimoto, Osaka (JP); Katsuya Uruma, Osaka (JP); Masato Nakamura, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/721,000

(22) PCT Filed: Jun. 23, 2023

(86) PCT No.: PCT/JP2023/023282
§ 371 (c)(1),
(2) Date: Nov. 14, 2024

(87) PCT Pub. No.: WO2024/224650
PCT Pub. Date: Oct. 31, 2024

(65) Prior Publication Data
US 2025/0239425 A1 Jul. 24, 2025

(30) Foreign Application Priority Data
Apr. 26, 2023 (JP) ................................ 2023-072640

(51) Int. Cl.
*H01H 39/00* (2006.01)

(52) U.S. Cl.
CPC ................................ *H01H 39/006* (2013.01)

(58) Field of Classification Search
CPC .. H01H 39/006; H01H 39/002; H01H 39/004; H01H 2039/008; H01H 9/30; H01H 9/302; H01H 9/36; H01H 9/52; H01H 50/02; H01H 71/02; H01H 71/025; H01H 71/10
USPC ........ 200/61.08, 300; 218/95, 154; 337/403; 89/1.14
See application file for complete search history.

(56) References Cited

U.S. PATENT DOCUMENTS 11,482,391 B2 * 10/2022 Marlin ................ H01H 39/006
2014/0083825 A1 3/2014 Fukuyama et al.
2015/0207264 A1 7/2015 Arai et al.
(Continued)

FOREIGN PATENT DOCUMENTS

DE 202020104502 U1 10/2021
EP 4270435 A1 11/2023
(Continued)

OTHER PUBLICATIONS

International Search Report dated Aug. 15, 2023 issued in International Patent Application No. PCT/JP2023/023282.

*Primary Examiner* — William A Bolton
(74) *Attorney, Agent, or Firm* — Rimon P.C.

(57) ABSTRACT

This breaker device includes a resin member, an igniter, and a conductor. The resin member includes an internal space. The igniter introduces gas into the internal space. The conductor is plate-shaped and located below the igniter. The conductor includes: a first holding portion embedded in the resin member; a second holding portion embedded in the resin member; and a connecting portion connecting the first holding portion and the second holding portion. The first holding portion includes a through-hole.

20 Claims, 16 Drawing Sheets

(56) References Cited

U.S. PATENT DOCUMENTS

| | | | | |
|---|---|---|---|---|
| 2017/0229266 | A1* | 8/2017 | Cortes | H01H 9/36 |
| 2019/0244778 | A1* | 8/2019 | Dariavach | H01H 39/006 |
| 2020/0350131 | A1* | 11/2020 | Volkmann | B23D 15/14 |
| 2021/0233728 | A1* | 7/2021 | Nakatani | H01H 9/30 |
| 2021/0350991 | A1* | 11/2021 | Fukuda | H01H 39/006 |
| 2022/0139653 | A1* | 5/2022 | Sakai | H01H 39/006 337/298 |
| 2022/0328268 | A1* | 10/2022 | Kesarkar | H01H 39/006 |
| 2023/0260726 | A1 | 8/2023 | Gaudinat et al. | |

FOREIGN PATENT DOCUMENTS

| | | | |
|---|---|---|---|
| JP | 2013-041798 | A | 2/2013 |
| JP | 2014-049411 | A | 3/2014 |
| JP | 2014-067618 | A | 4/2014 |
| JP | 2022-104372 | A | 7/2022 |
| WO | 2022/003080 | A1 | 1/2022 |

* cited by examiner

BREAKER DEVICE

This application is the U.S. National Phase under 35 U.S.C. § 371 of International Patent Application No. PCT/JP2023/023282, filed on Jun. 23, 2023, which in turn claims the benefit of Japanese Patent Application No. 2023-072640, filed on Apr. 26, 2023, the entire disclosures of which Applications are incorporated by reference herein.

TECHNICAL FIELD

The present disclosure generally relates to breaker devices. More specifically, the present disclosure relates to a breaker device including an igniter.

BACKGROUND ART

Patent Literature (PTL) 1 discloses a breaker device. This breaker device includes a housing as an outer shell member, an igniter, a projectile, and a conductor.

The housing includes a housing space that extends from the upper end side to the lower end side. The housing space is a space formed in a straight line so that the projectile can move. The projectile is projected along the housing space by energy received from the igniter. The conductor includes, in a portion thereof, a cutoff portion to be cut off by the projectile that moves by the energy received from the igniter. The conductor is disposed with the cut-off portion crossing the housing space.

CITATION LIST

Patent Literature

PTL 1: Unexamined Japanese Patent Publication No. 2022-104372

SUMMARY OF INVENTION

In the breaker device disclosed in PTL 1, when the cutoff portion is cut off in the state where an electric current flows to the conductor, an arc discharge may occur. Therefore, in the breaker device, a conductive gas generated by the arc discharge may leak out of the housing. If the conductive gas generated by the arc discharge leaks out of the breaker device, this may cause adverse effects such as deterioration of insulation on an external member.

An object of the present disclosure is to make a conductive gas attributed to an electric arc less likely to leak out of a breaker device.

A breaker device according to one aspect of the present disclosure includes a resin member, an igniter, and a conductor. The resin member includes an internal space. The igniter introduces gas into the internal space. The conductor is plate-shaped and located below the igniter. The conductor includes: a first holding portion embedded in the resin member; a second holding portion embedded in the resin member; and a connecting portion connecting the first holding portion and the second holding portion. The first holding portion includes a through-hole.

According to the present disclosure, it is possible to make a conductive gas attributed to an electric arc less likely to leak out of a breaker device, which is advantageous.

DESCRIPTION OF EMBODIMENTS

Figure 1:
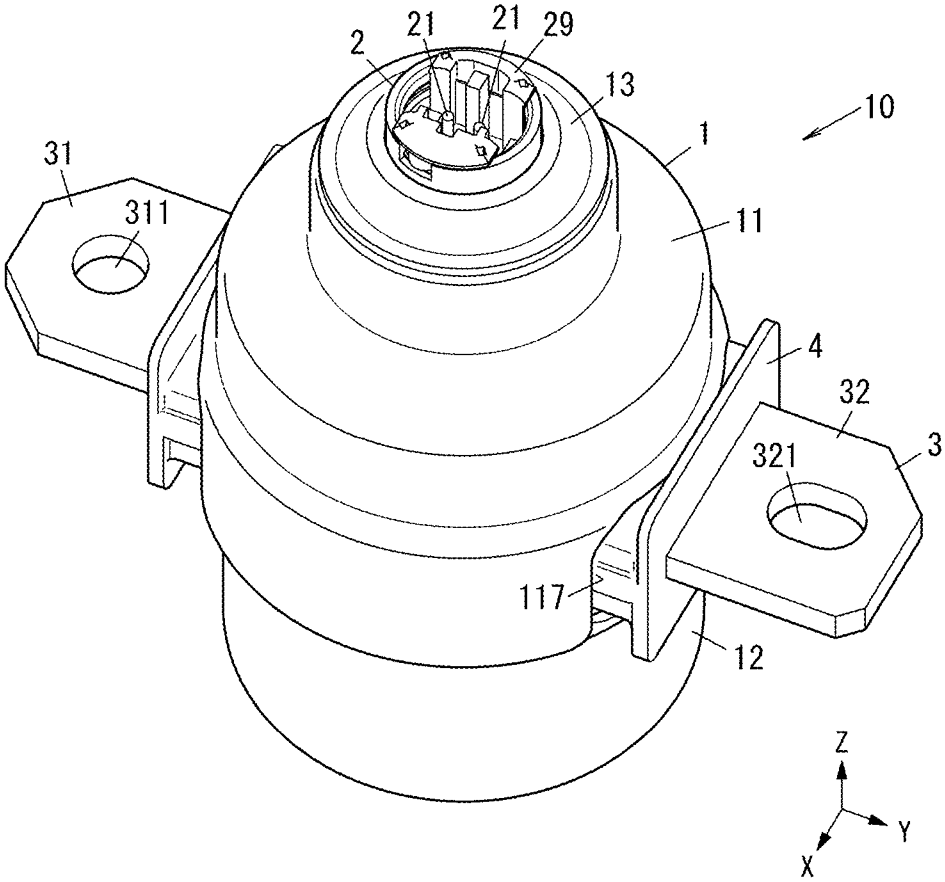
FIG. 1 is a perspective view of a breaker device according to an exemplary embodiment.

Hereinafter, breaker devices according to exemplary embodiments of the present disclosure will be described with reference to the attached drawings. Note that each of the following exemplary embodiments is merely a part of various exemplary embodiments of the present disclosure. Various changes can be made to each of the following exemplary embodiments according to the design or the like as long as the object of the present disclosure can be achieved. Furthermore, each figure described in the following exemplary embodiments is a schematic diagram, meaning that the ratio between the sizes of structural elements in each figure and the ratio between the thicknesses of structural elements in each figure do not necessarily reflect an actual dimension ratio.

(1) Exemplary Embodiment

Breaker device 10 according to the present exemplary embodiment will be described with reference to FIG. 1 to FIG. 12.

Breaker device 10 is a device mounted on an object including an electrical circuit that allows the passage of an electric current supplied from a power supply. For example, breaker device 10 operates to interrupt the electrical circuit when an anomaly occurs in the electrical circuit, a system, or the like in the object, to thereby prevent damage due to the anomaly from becoming serious.

Breaker device 10 is mounted on a vehicle, which is one example of the object, for example. For example, breaker device 10 is connected between a motor and a battery (for example, a lithium-ion battery) for driving the motor in the vehicle to interrupt the electrical connection between the motor and the battery for driving the motor at the time of emergency such as an abnormal time or the time of an accident. The object may be something other than a vehicle; examples of the object include, but are not limited to, a home appliance and a photovoltaic system.

(1. 1) Configuration of Breaker Device

As illustrated in FIG. 1 to FIG. 4, breaker device 10 includes casing 1, igniter 2, conductor 3, resin member 4, pusher 5, protective portion 6, and elastic members 71 to 74.

In the following description, three axes (the X-axis, the Y-axis, and the Z-axis) of the right-handed three-dimensional Cartesian coordinate system are defined for breaker device 10 as follows. Specifically, a direction along the axis of through-hole 40 passing through resin member 4 in the shape of a cylinder is defined as a Z-axis direction, a direction perpendicular to the Z-axis direction and extending along a direction in which conductor 3 in the shape of a plate extends is defined as a Y-axis, and a direction perpendicular to the Y-axis direction and the Z-axis direction is defined as an X-axis direction. Furthermore, for the sake of explanation, a direction along the Z-axis is also referred to as an up-down direction, an area (on the positive side of the Z-axis) in which igniter 2 is located as viewed from conductor 3 is also referred to as "up/upper/top/above", and an area opposite to said area is also referred to as "down/lower/bottom/below." A direction along the Y-axis is also referred to as a left-right direction, an area (on the positive side of the Y-axis) in which second terminal portion 32 is located as viewed from first terminal portion 31 of conductor 3 is also referred to as "right", and an area opposite to said area is also referred to as "left." A direction along the X-axis is also referred to as a front-back direction, the positive side of the X-axis is also referred to as "front", and the side opposite to said side is also referred to as "back." Note that the definitions of the axes and the directions in the present disclosure merely represent relative positional relationships between members of breaker device 10 and do not limit the posture, etc., of breaker device 10 when installed on the object.

Figure 3:
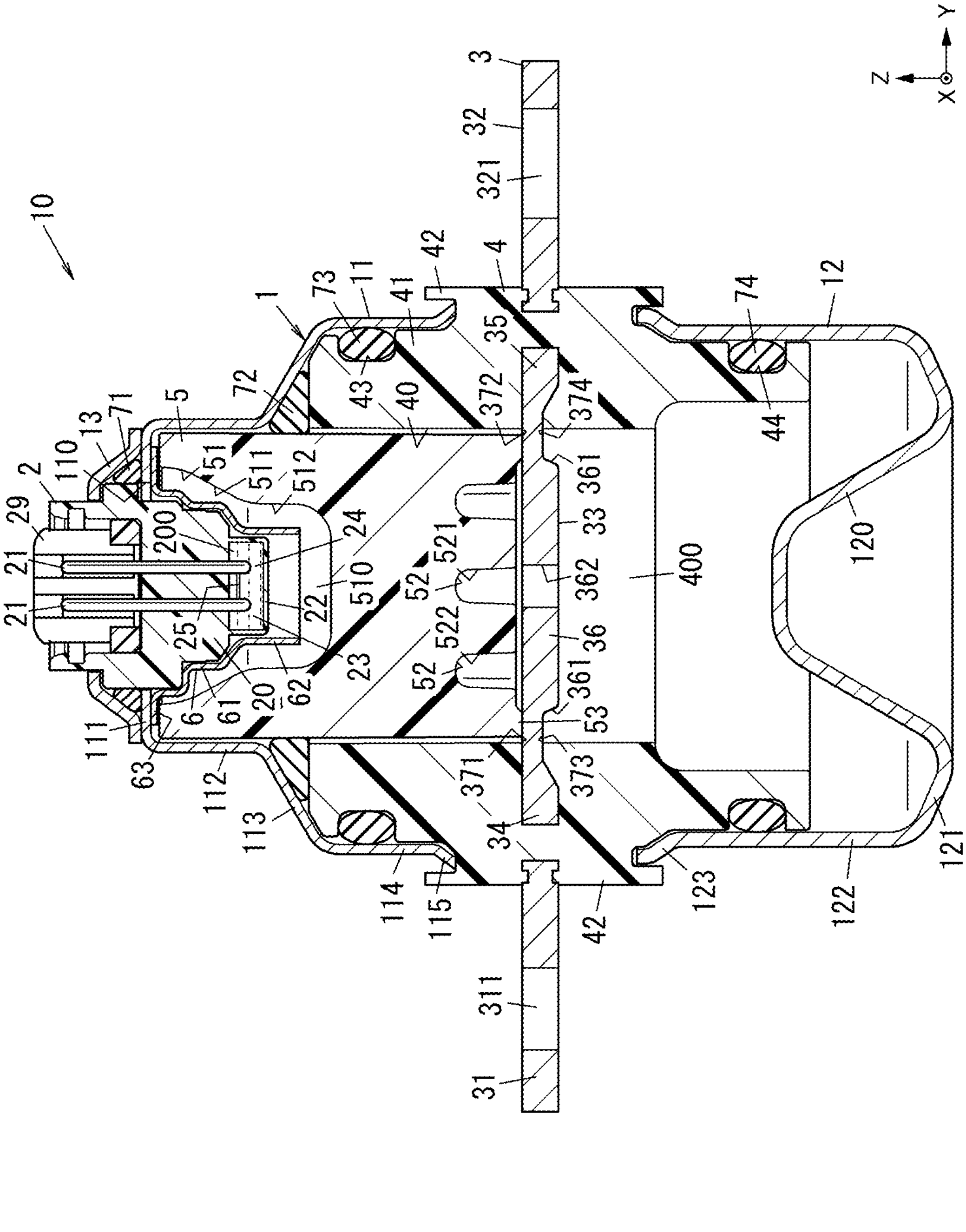
FIG. 3 is a cross-sectional view of the breaker device cut along a plane perpendicular to the X-axis.
Figure 4:
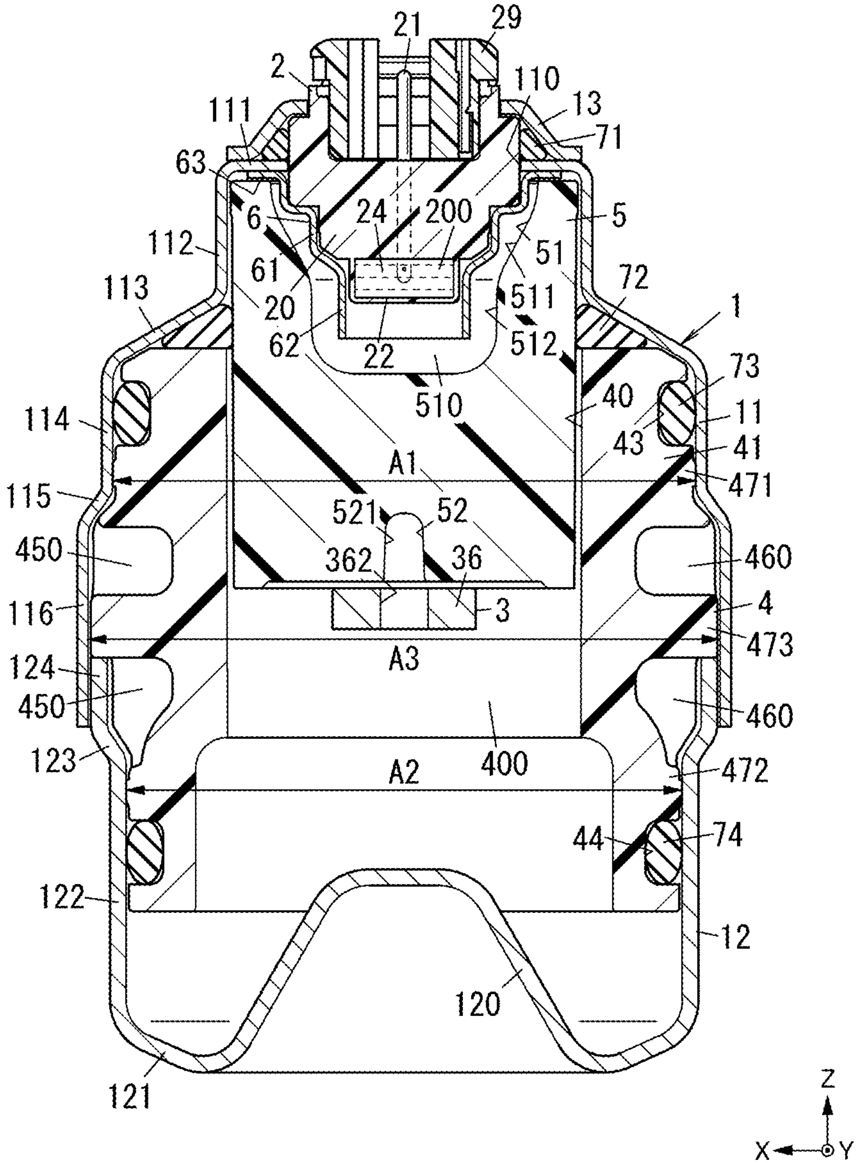
FIG. 4 is a cross-sectional view of the breaker device cut along a plane perpendicular to the Y-axis.

Casing 1 constitutes the outer shell of breaker device 10. As illustrated in FIG. 3 and FIG. 4, casing 1 is in the shape of a hollow cylinder. Casing 1 is formed of a metal such as stainless steel (SUS), for example. However, this is not limiting; casing 1 may be formed of another metal such as aluminum. As illustrated in FIG. 3, igniter 2 (at least a lower end portion thereof), a portion (a part including connecting portion 36 to be described later) of conductor 3, resin member 4, pusher 5, protective portion 6, and elastic members 71 to 74 are housed in casing 1.

As illustrated in FIG. 1 to FIG. 4, casing 1 includes upper casing 11 and lower casing 12.

Upper casing 11 is in the shape of a cylinder that is hollow inside, has opening 110 at the center of an upper bottom, and is open across a lower bottom. Upper casing 11 includes upper bottom portion 111, first cylindrical portion 112, first connecting portion 113, second cylindrical portion 114, second connecting portion 115, and first joining portion 116.

Upper bottom portion 111 is in the shape of a disc (ring) having opening 110 at the center. First cylindrical portion 112 is in the shape of a circular cylinder extending downward from the outer rim of upper bottom portion 111.

Second cylindrical portion 114, which is in the shape of a circular cylinder that is greater in diameter than first cylindrical portion 112, is disposed at a distance below first cylindrical portion 112 coaxially with first cylindrical portion 112.

Figure 2:
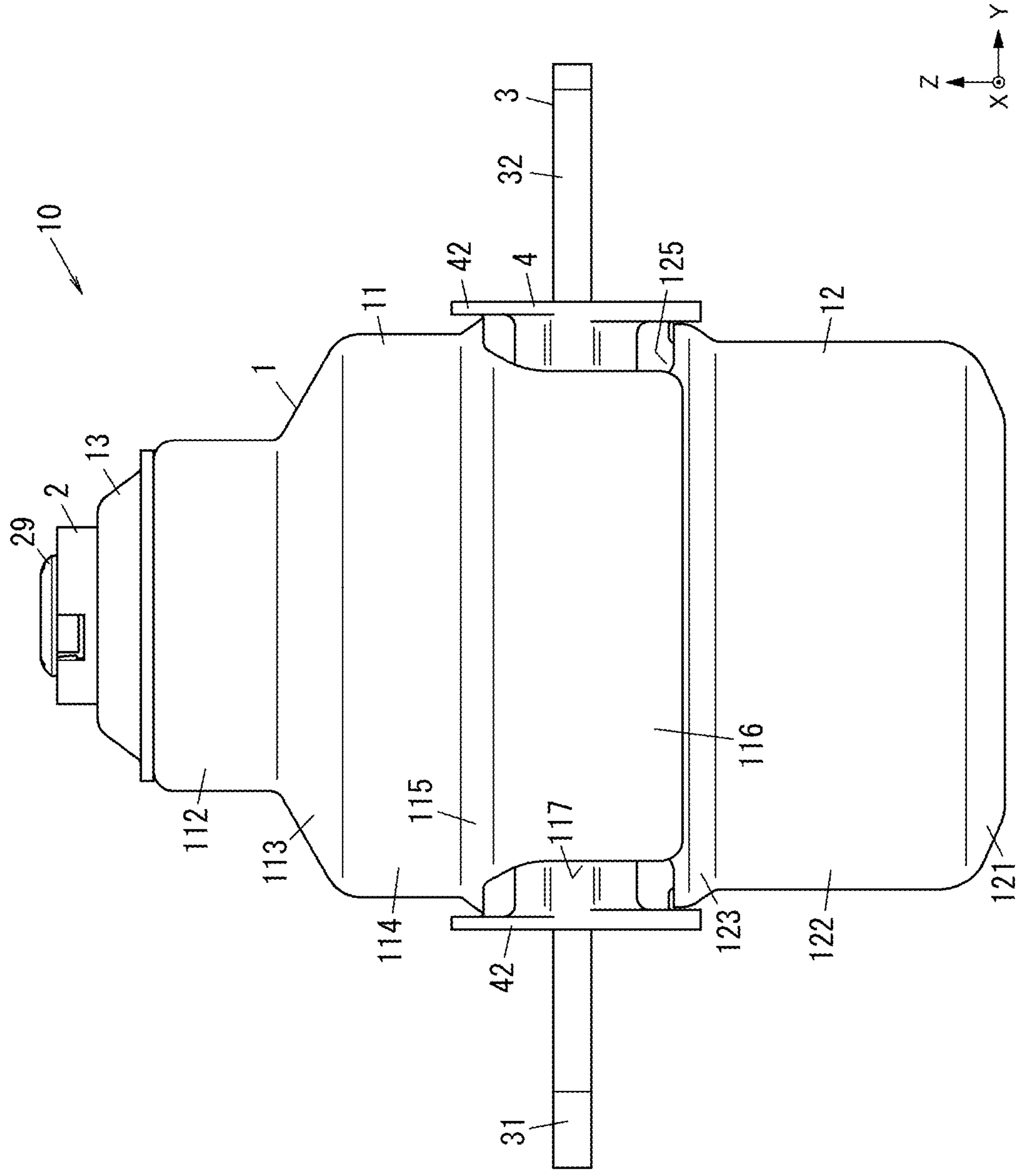
FIG. 2 is a front view of the breaker device.

First joining portion 116, which is in the shape of a circular cylinder that is greater in diameter than second cylindrical portion 114, is disposed at a distance below second cylindrical portion 114 coaxially with second cylindrical portion 114. As illustrated in FIG. 1 and FIG. 2, first joining portion 116 includes, at opposite left and right ends, cutouts 117, each of which is cut out of first joining portion 116 from the lower end to the upper end thereof and is approximately rectangular as viewed from the side. Therefore, it can also be said that first joining portion 116 includes a pair of arc plate members.

First connecting portion 113 is in the shape of a cylinder, the diameter of which increases downward, and connects first cylindrical portion 112 and second cylindrical portion 114 in the up-down direction. Second connecting portion 115 is in the shape of a cylinder, the diameter of which increases downward, and connects second cylindrical portion 114 and first joining portion 116 in the up-down direction.

Lower casing 12 is in the shape of a cylinder with a closed bottom that is hollow inside and open at an upper bottom. Lower casing 12 includes lower bottom portion 121, third cylindrical portion 122, third connecting portion 123, and second joining portion 124.

Lower bottom portion 121 is in the shape of a circular tray including projection 120 in the shape of a truncated cone that projects upward. Projection 120 opposes igniter 2 across conductor 3 (connecting portion 36 to be described later). Projection 120 comes into contact with conductor 3 and pusher 5 that move downward by gas generated due to igniter 2, resulting in downward deformation such that projection 120 is squashed. In other words, projection 120 has the function of absorbing the impact (kinetic energy) of conductor 3 and pusher 5 by deformation. Lower bottom portion 121 does not necessarily need to include projection 120.

Third cylindrical portion 122 is in the shape of a circular cylinder extending upward from the outer rim of lower bottom portion 121.

Second joining portion 124, which is in the shape of a circular cylinder that is greater in diameter than third cylindrical portion 122, is disposed at a distance above third cylindrical portion 122 coaxially with third cylindrical portion 122. Second joining portion 124 includes, at opposite left and right ends, cutouts 125, each of which is cut out of second joining portion 124 from the upper end to the lower end thereof. Therefore, it can also be said that second joining portion 124 includes a pair of arc plate members.

Third connecting portion 123 is in the shape of a cylinder, the diameter of which increases upward, and connects third cylindrical portion 122 and second joining portion 124 in the up-down direction.

Upper casing 11 and lower casing 12 are fixed to each other by overlapping the lower end of first joining portion 116 of upper casing 11 and second joining portion 124 of lower casing 12 and then joining the overlapping portions together by welding, for example. The welding is laser welding, for example, but this is not limiting; other welding methods such as tungsten inert gas (TIG) welding and projection welding may also be used. Furthermore, the method for fixing upper casing 11 and lower casing 12 is not limited to welding and may be other methods such as holding with screws, for example.

Resin member 4 is formed from a resin material such as a synthetic resin.

As illustrated in FIG. 1 to FIG. 4, resin member 4 includes cylindrical body portion 41 and a pair of protruding portions 42.

Cylindrical body portion 41, which is in the shape of a hollow cylinder having a predetermined thickness in the radial direction, is in the approximate shape of a hollow circular cylinder. Cylindrical body portion 41 has through-hole 40 extending therethrough in the axial direction. Therefore, as illustrated in FIG. 3 and FIG. 4, resin member 4 (cylindrical body portion 41) includes internal space 400 (the space within through-hole 40). The diameter of through-hole 40 is equal to the inner diameter of first cylindrical portion 112 of upper casing 11. Note that in the present disclosure, two elements being "equal" or "the same" may refer to two elements being equal or the same in a strict sense, but this is not limiting; being "equal" or "the same" may also refer to being in substantially equivalent ranges, for example, and may also include about a few percent (or about 10%) difference, for example.

First housing groove 43 is formed in the circumferential direction near the upper end of cylindrical body portion 41. Second housing groove 44 is formed in the circumferential direction near the lower end of cylindrical body portion 41.

The pair of protruding portions 42 protrude from left and right side surfaces of cylindrical body portion 41. Each of the pair of protruding portions 42, which is in the approximate shape of a rectangular column, includes a flange at a protruding end thereof.

Cylindrical body portion 41 of resin member 4 is located inside casing 1 in the state where the axial direction of cylindrical body portion 41 is along the axial direction of casing 1, and resin member 4 is held on casing 1 in such a manner that the pair of protruding portions 42 protrude from casing 1 through the pair of openings formed by cutouts 117, 125 of casing 1. Thus, resin member 4 (cylindrical body portion 41 thereof) is located inside casing 1.

Note that resin member 4 includes protruding portions 42 in order to, for example, ensure the airtightness of internal space 400 of resin member 4 by edge portions of cutouts 117, 125 of casing 1 coming into contact with protruding portions 42; however, protruding portions 42 may be omitted.

Conductor 3 is a conductive metal body. Conductor 3 is connected to electric components (such as a battery and a motor) of an object on which breaker device 10 is mounted, and forms an electrical circuit together with these electric components. Conductor 3 is formed of a metal such as copper (Cu), for example. Note that conductor 3 may be formed of a metal other than copper or may be formed of an alloy of copper and another metal. For example, conductor 3 may contain manganese (Mn), nickel (Ni), platinum (Pt), or the like.

As illustrated in FIG. 1 to FIG. 3, conductor 3 is plate-shaped. Conductor 3 is in the shape of a flat plate extending in the left-right direction and having a thickness in the up-down direction. Conductor 3 is held on resin member 4 so as to penetrate resin member 4 in the left-right direction. Conductor 3 penetrates one of protruding portions 42, cylindrical body portion 41, and the other of protruding portions 42. For example, resin member 4 is formed by insert molding in which conductor 3 is an insert part, and thus conductor 3 is formed integrally with resin member 4. Conductor 3 is located below igniter 2.

As illustrated in FIG. 3, conductor 3 includes first terminal portion 31, second terminal portion 32, and conductive portion 33.

First terminal portion 31 is a portion of conductor 3 that protrudes to the left from the left side surface of left protruding portion 42 of resin member 4. First terminal portion 31 protrudes from casing 1. Here, first terminal portion 31 protrudes to the left from the left side surface of casing 1. First terminal portion 31 can be used as a terminal that is connected to an electric component of the object.

Second terminal portion 32 is a portion of conductor 3 that protrudes to the right from the right side surface of left protruding portion 42 of resin member 4. Second terminal portion 32 protrudes from casing 1. Here, second terminal portion 32 protrudes to the right from the right side surface of casing 1. In other words, second terminal portion 32 protrudes from casing 1 on the side opposite to first terminal portion 31 in the left-right direction. Second terminal portion 32 can be used as a terminal that is connected to an electric component of the object.

Conductive portion 33 is a portion of conductor 3 that connects first terminal portion 31 and second terminal portion 32. As illustrated in FIG. 3 and FIG. 4, conductive portion 33 is located below igniter 2. A part of conductive portion 33 is located inside through-hole 40 (inside internal space 400), and the remaining part of conductive portion 33 is embedded in resin member 4. Conversely, resin member 4 embeds a part of conductor 3. Therefore, conductor 3 is held on resin member 4 at a part of conductive portion 33 that is embedded in resin member 4. Hereinafter, a part of conductive portion 33 that is embedded in resin member 4 and connected to first terminal portion 31 (a left part of conductive portion 33) will also be referred to as "first holding portion 34." A part of conductive portion 33 that is embedded in resin member 4 and connected to second terminal portion 32 (a right part of conductive portion 33) will also be referred to as "second holding portion 35." A part of conductive portion 33 that is located in internal space 400 inside through-hole 40 (a central part of conductive portion 33) will also be referred to as "connecting portion 36." Connecting portion 36 connects first holding portion 34 and second holding portion 35 to each other.

Figure 7:
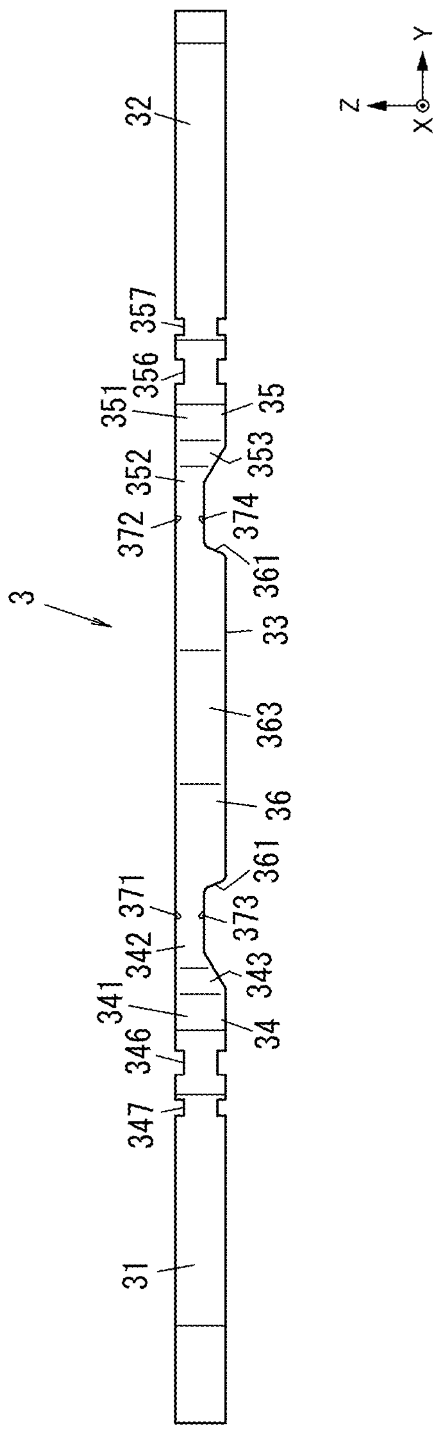
FIG. 7 is a front view of a conductor included in the breaker device.
Figure 8A:
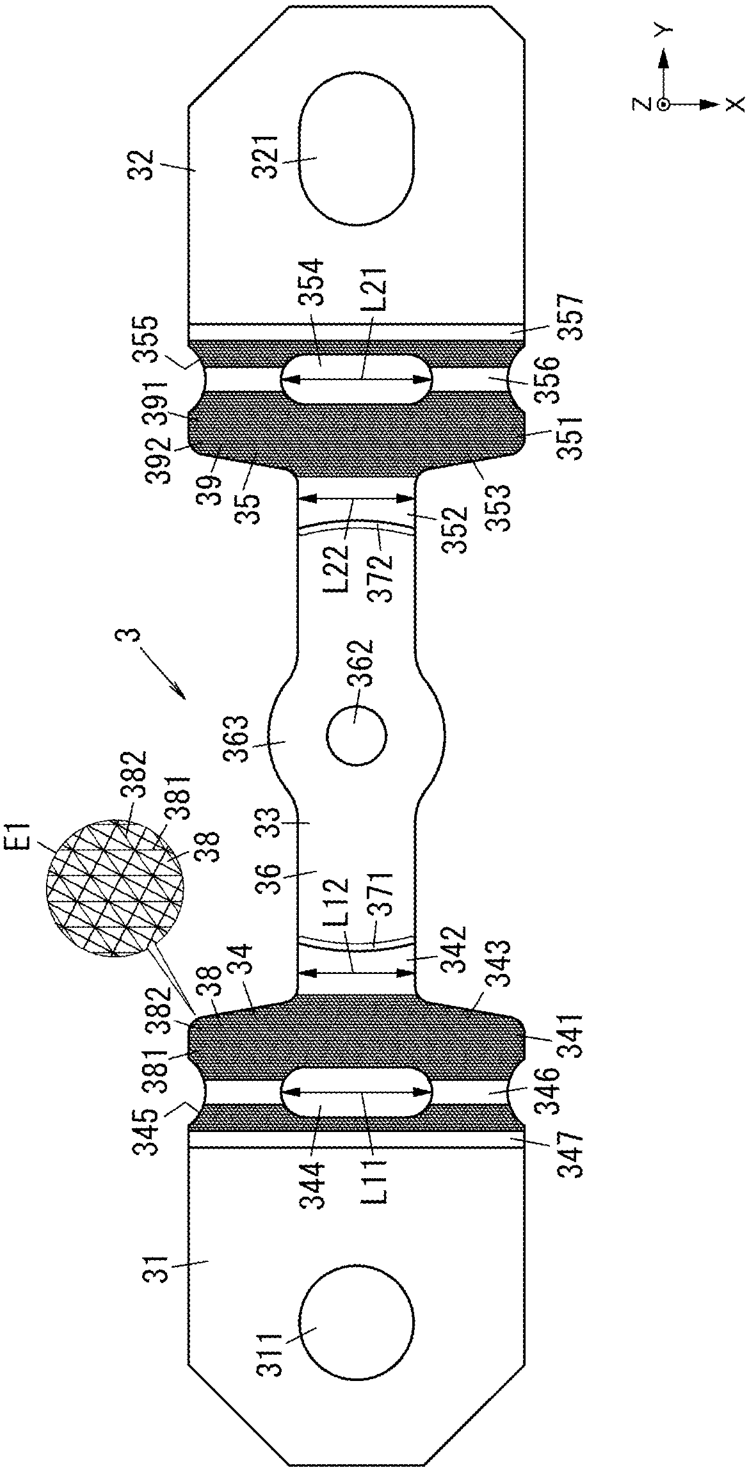
FIG. 8A is a top view of a conductor included in the breaker device.

As illustrated in FIG. 3, FIG. 7, and FIG. 8A, separation groove 371 is formed on the upper surface of conductor 3 near the boundary between first holding portion 34 and connecting portion 36. Furthermore, separation groove 372 is formed on the upper surface of conductor 3 near the boundary between second holding portion 35 and connecting portion 36. Moreover, separation groove 373 is formed on the lower surface of conductor 3 near the boundary between first holding portion 34 and connecting portion 36 (at a position on the back side opposite separation groove 371). Separation groove 374 is formed on the lower surface of conductor 3 near the boundary between second holding portion 35 and connecting portion 36 (at a position on the back side opposite separation groove 372). Each of separation grooves 371 to 374 has a shape corresponding to the outline of pusher 5. Furthermore, the shape of each of separation grooves 371 to 374 follows the inner periphery of through-hole 40 of resin member 4. Each of separation grooves 371 to 374 is arc-shaped.

Igniter 2 is an electric igniter. As illustrated in FIG. 3 and FIG. 4, igniter 2 includes case 20, two conducting pins 21, gunpowder 24, and heat-generating element 25. Gunpowder 24 is housed in housing space 200 of case 20, and two conducting pins 21 are connected via heat-generating element 25 in housing space 200. Case 20 includes, in a lower area, lid portion 22 that closes housing space 200.

As illustrated in FIG. 3 and FIG. 4, igniter 2 is inserted into casing 1 through opening 110 of upper casing 11 of casing 11 and is held on casing 1 so that lid portion 22 faces downward and a portion (a lower end portion) of igniter 2 is housed in recessed area 51 of pusher 5.

Connector receiver 29 is disposed above igniter 2. A connector including two connection terminals to be connected to two conducting pins 21 is connected to connector receiver 29. The two connection terminals of the connector are supplied with operating current from a control unit of an object on which breaker device 10 is mounted (for example, an electronic control unit (ECU) or the like of a vehicle). When the operating current is supplied to heat-generating element 25 via two conducting pins 21, gunpowder 24 is ignited and burned, thus generating gas. The generated gas increases the internal pressure of housing space 200. When the internal pressure of housing space 200 exceeds the pressure capacity of lid portion 22, lid portion 22 is opened (busted), and the gas is released at high pressure to the outside of igniter 2. In this manner, igniter 2 generates gas. In lid portion 22, a structure from which lid portion 22 starts to open such as a cross-shaped groove may be provided, for example. Note that what supplies the operating current to conducting pins 21 is not limited to the control unit of the object. For example, a mechanism that automatically allows the operating current to flow when an anomaly occurs in the object (for example, a mechanism that supplies, as the operating current, an induced current generated at a coil that moves relative to a magnet according to impact on a vehicle body) may supply the operating current to conducting pins 21.

As illustrated in FIG. 1 to FIG. 4, casing 1 further includes lid member 13. Lid member 13 is in the shape of a tapered cylinder that includes a flange at the lower end and is open at the top. Lid member 13 covers igniter 2 from above in such a manner that conducting pins 21 are exposed. For example, with the flange fixed to the upper surface of upper bottom portion 111 of upper casing 11 by welding or the like, lid member 13 is fixed to upper casing 11.

Figure 6:
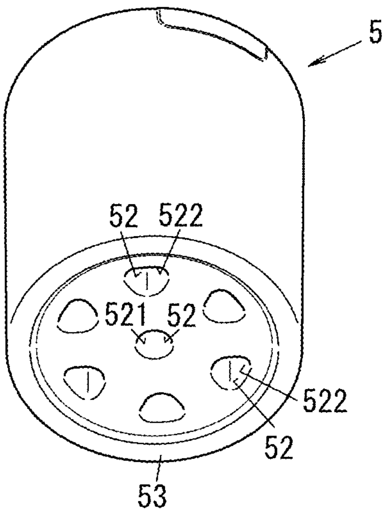
FIG. 6 is a perspective view of a pusher included in the breaker device.

Pusher 5 is formed from an insulating member such as a synthetic resin, for example. Pusher 5 is formed from nylon, for example. As illustrated in FIG. 3, FIG. 4, and FIG. 6, pusher 5 is a member in the shape of a column; in the present exemplary embodiment, pusher 5 is a member in the shape of a circular column. The outer diameter of pusher 5, which corresponds to the inner diameter of first cylindrical portion 112 of upper casing 11 and the inner diameter of through-hole 40 of resin member 4, is slightly smaller than said inner diameters.

As illustrated in FIG. 3 and FIG. 4, recessed area 51 for disposing igniter 2 is formed on the upper surface of pusher 5. Recessed area 51 is depressed downward from the upper surface of pusher 5. Recessed area 51 includes: first portion 511, the diameter of which is gradually reduced downward; and second portion 512, the diameter of which is approximately constant, located below first portion 511 and connected to first portion 511. In recessed area 51 of pusher 5, space (pressurized space) 510, which is pressurized by the gas generated at igniter 2, is formed.

As illustrated in FIG. 3, FIG. 4, and FIG. 6, two or more (in the present exemplary embodiment, seven) recessed areas 52, which are depressed upward, are formed on the lower surface of pusher 5. Among seven recessed areas 52, one recessed area 521 is formed at the center of the lower surface of pusher 5. Six remaining recessed areas 522 are formed at circumferentially equal angular intervals at positions located about midway between the center and the outer rim of the lower surface of pusher 5 in the radial direction of the lower surface. Furthermore, on the lower surface of pusher 5, support projection 53 in the shape of a ring extending along the outer rim of the lower surface and projecting downward relative to a central area of the lower surface is formed.

As illustrated in FIG. 3 and FIG. 4, in the space surrounded by upper bottom portion 111 and first cylindrical portion 112 of casing 11, the inner surface of through-hole 40 of resin member 4, and conductive portion 33 of conductor 3, pusher 5 is disposed with the support projection 53 mounted on conductive portion 33 (the first position of pusher 5). In other words, pusher 5 is disposed at the first position between igniter 2 and conductor 3 (first holding portion 34 and second holding portion 35) that has not been split or cut yet. Pusher 5 is mounted on the upper surface of conductive portion 33 so that among six recessed areas 522, two recessed areas 522 overlap with conductor 3 in the up-down direction and four remaining recessed areas 522 do not overlap with conductor 3 in the up-down direction, for example.

Pusher 5 moves downward from the first position to the second position by the gas generated at igniter 2. The second position is the position of pusher 5 with the lower end located below the lower end of conductor 3 (first holding portion 34 and second holding portion 35); for example, the second position is the position of pusher 5 illustrated in FIG. 5. At the time of moving from the first position to the second position, pusher 5 pushes conductive portion 33 downward from above and thereby cuts off connecting portion 36 of conductive portion 33 from first holding portion 34 and second holding portion 35.

In essence, breaker device 10 includes pusher 5. Pusher 5 is disposed at the first position between conductor 3 and igniter 2. By the gas generated at igniter 2, pusher 5 moves from the first position, splits or cuts a portion (connecting portion 36) of conductor 3, and moves to the second position located below the first position. In the state where pusher 5 is located at the second position (refer to FIG. 5), since housing space 200 of igniter 2 is connected to internal space 400 of resin member 4, the gas generated from igniter 2 is also introduced into internal space 400 of resin member 4. Note that part of the gas generated from igniter 2 is also introduced into the lower space of casing 1 (the space where connecting portion 36 is located) through gaps between the inner surface of through-hole 40 of resin member 4 and the outer surface of pusher 5.

Protective portion 6 is a member for protecting pusher 5 from being damaged by lid portion 22 of igniter 2 when igniter 2 generates gas. Protective portion 6 is formed of a metal such as stainless steel (SUS), for example, but may be formed of other metals such as aluminum or may be formed of a resin.

Protective portion 6 includes first cylindrical portion 61, second cylindrical portion 62, and flange portion 63.

First cylindrical portion 61, which is a part in the shape of a cylinder surrounding the lateral side of igniter 2, has a shape that follows the external shape of case 20 of igniter 2. For example, first cylindrical portion 61 is formed in the shape of a staircase (for example, in the form of a two-step staircase), the diameter of which is reduced stepwise downward in a cross-sectional view. Note that the shape of first cylindrical portion 61 is not limited to this shape; for example, first cylindrical portion 61 may have a tapered shape with a diameter reduced downward or may have another shape.

Second cylindrical portion 62 is located below first cylindrical portion 61 and is in the shape of a cylinder smaller in diameter than first cylindrical portion 61. Second cylindrical portion 62 protrudes downward from the lower end of first cylindrical portion 61. Second cylindrical portion 62 protrudes downward so that the lower end of second cylindrical portion 62 is positioned at a level below lid portion 22 of igniter 2. A part of lid portion 22 that has opened at the time of gas generation from igniter 2 (refer to FIG. 5) may come into contact with second cylindrical portion 62. When there is second cylindrical portion 62, lid portion 22 is less likely to collide with pusher 5.

Flange portion 63 is in the shape of a ring protruding outward from the upper end of first cylindrical portion 61 as viewed from above. Flange portion 63 is fixed to the lower surface of upper bottom portion 111 of upper casing 11 by welding or the like. In this manner, protective portion 6 is fixed to casing 1. Flange portion 63 may be fixed to upper bottom portion 111 without spacing along the entire circumference thereof.

Note that in the present disclosure, the phrase "in plan view" is used interchangeably with the phrase "as viewed from above"; these phrases have substantially the same meanings.

Elastic members 71 to 74 are members for increasing the airtightness of the internal space of casing 1. Elastic members 71 to 74 reduce the likelihood that the gas generated due to igniter 2 will leak from the internal space of casing 1 to the space outside.

Each of elastic members 71 to 74 is a member with elasticity such as rubber; in the present exemplary embodiment, each of elastic members 71 to 74 is an O-ring formed in a loop. Each of elastic members 71 to 74 is disposed in the state of being pressed (a deformed state).

Elastic member 71 is disposed in the space formed between the upper surface of upper bottom portion 111 of upper casing 11, lid member 13, and the side surface of the case of igniter 2. Elastic member 71 is pressed in contact with each of upper bottom portion 111, lid member 13, and igniter 2.

Elastic member 72 is disposed in the space formed between the inner surface of first connecting portion 113 of upper casing 11, the upper surface of cylindrical body portion 41 of resin member 4, and the outer side surface of pusher 5. Elastic member 72 is pressed in contact with each of first connecting portion 113, resin member 4, and pusher 5. Elastic member 72 separates space 510 inside recessed area 51 and the space where conductor 3 is located when pusher 5 is at the first position (refer to FIG. 3 and FIG. 4).

Elastic member 73 is disposed in the space formed between the inner side surface of second cylindrical portion 114 of upper casing 11 and the inner surface of first housing groove 43 of cylindrical body portion 41 of resin member 4. Elastic member 73 is pressed in contact with each of at least the bottom surface of first housing groove 43 and second cylindrical portion 114.

Elastic member 74 is disposed in the space formed between the inner side surface of third cylindrical portion 122 of lower casing 12 and the inner surface of second housing groove 44 of cylindrical body portion 41 of resin member 4. Elastic member 74 is pressed in contact with each of at least the bottom surface of second housing groove 44 and third cylindrical portion 122.

(1. 2) Operation of Breaker Device

Figure 5:
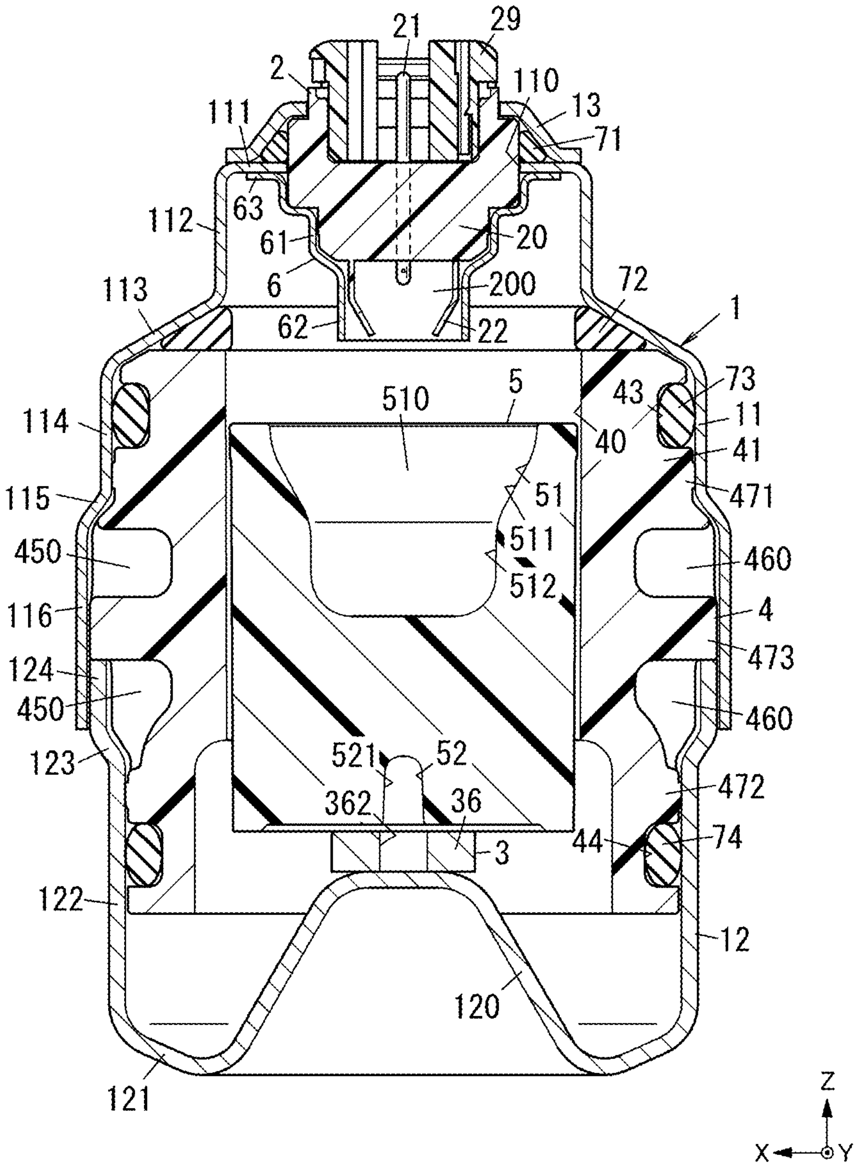
FIG. 5 is a cross-sectional view of the breaker device cut along a plane perpendicular to the Y-axis after an interrupting operation.

The operation of breaker device 10 will be described with reference to FIG. 3 to FIG. 5.

(1. 2. 1) Normal Operation

The operation (normal operation) of breaker device 10 with igniter 2 not driven will be described first. In the normal operation, pusher 5 is located at the first position (the position illustrated in FIG. 3 and FIG. 4).

As mentioned above, breaker device 10 is mounted on an object such as a vehicle. For example, a positive terminal of a battery is connected to first terminal portion 31 of conductor 3 via an electric component as necessary. Furthermore, a negative terminal of the battery is connected to second terminal portion 32 of conductor 3 via the electric component as necessary. As a result, conductor 3 of breaker device 10 forms an electrical path through which an electric current supplied from the battery passes, and thus an electrical circuit is formed in the object. When a switch included in the electric component is turned ON, the electric current from the battery is supplied to the electrical circuit including conductor 3.

(1. 2. 2) Interrupting Operation

The operation (interrupting operation) of breaker device 10 with igniter 2 having been driven will be described next.

For example, when an anomaly such as an accident of a vehicle occurs in the object on which breaker device 10 is mounted, a control unit (for example, an ECU of the vehicle) that controls the operation of the object supplies an operating current to heat-generating element 25 via the connection terminals of the connector and conducting pins 21 of igniter 2.

When the operating current is supplied to heat-generating element 25, the temperature of heat-generating element 25 increases, causing an increase in the temperature of gunpowder 24 around heat-generating element 25. For example, when the temperature of gunpowder 24 reaches an ignition point, gunpowder 24 is ignited and burned, thus generates gas, and increases the pressure inside housing space 200 of igniter 2. When the pressure inside housing space 200 exceeds the pressure capacity of lid portion 22, lid portion 22 is opened (busted), and the gas inside housing space 200 is released at high pressure to space (pressurized space) 510 inside recessed area 51 of pusher 5.

Pusher 5 located at the first position (refer to FIG. 3 and FIG. 4) is pressed downward by the pressure of the gas inside pressurized space 510 and thus presses connecting portion 36 of conductor 3 downward. By being pressed by pusher 5, connecting portion 36 of conductor 3 is cut off from first holding portion 34 and second holding portion 35 along separation grooves 371 to 374 and moves downward together with pusher 5. When connecting portion 36 is cut off from first holding portion 34 and second holding portion 35, the electrical path is interrupted in breaker device 10. Thus, the electrical circuit in the object is interrupted.

In this manner, breaker device 10 operates when an anomaly occurs in the object, for example, to interrupt the electrical circuit in the object and can thus prevent damage due to the anomaly from becoming serious.

Note that pusher 5 and connecting portion 36 that are moving downward collide with projection 120 of lower casing 12 (refer to FIG. 5), lose energy while deforming projection 120, and stop moving (the second position of pusher 5).

(1. 3) Details of Conductor

Next, details of conductor 3 in breaker device 10 according to the present exemplary embodiment will be described in more detail with reference to FIG. 3, FIG. 4, and FIG. 7 to FIG. 9.

As described above, conductor 3, which is a flat member, includes first terminal portion 31, second terminal portion 32, and conductive portion 33.

First terminal portion 31 is a portion of conductor 3 that protrudes from casing 1 (resin member 4) to the left. First terminal portion 31, which is in the shape of a plate, has through-hole 311 penetrating first terminal portion 31 in the thickness direction (the up-down direction). Through-hole 311 can be used, for example, to connect first terminal portion 31 to an external power line or the like.

Second terminal portion 32 is a portion of conductor 3 that protrudes from casing 1 (resin member 4) to the right. Second terminal portion 32, which is in the shape of a plate, has through-hole 321 penetrating second terminal portion 32 in the thickness direction (the up-down direction). Through-hole 321 can be used, for example, to connect second terminal portion 32 to an external power line or the like.

Conductive portion 33 is a plate-shaped member extending in the left-right direction. Conductive portion 33 connects first terminal portion 31 and second terminal portion 32. As described above, conductive portion 33 includes first holding portion 34, second holding portion 35, and connecting portion 36.

(1.3.1) First Holding Portion

First holding portion 34 is a portion of conductive portion 33 that is embedded in resin member 4 and connects first terminal portion 31 and connecting portion 36.

Figure 9:
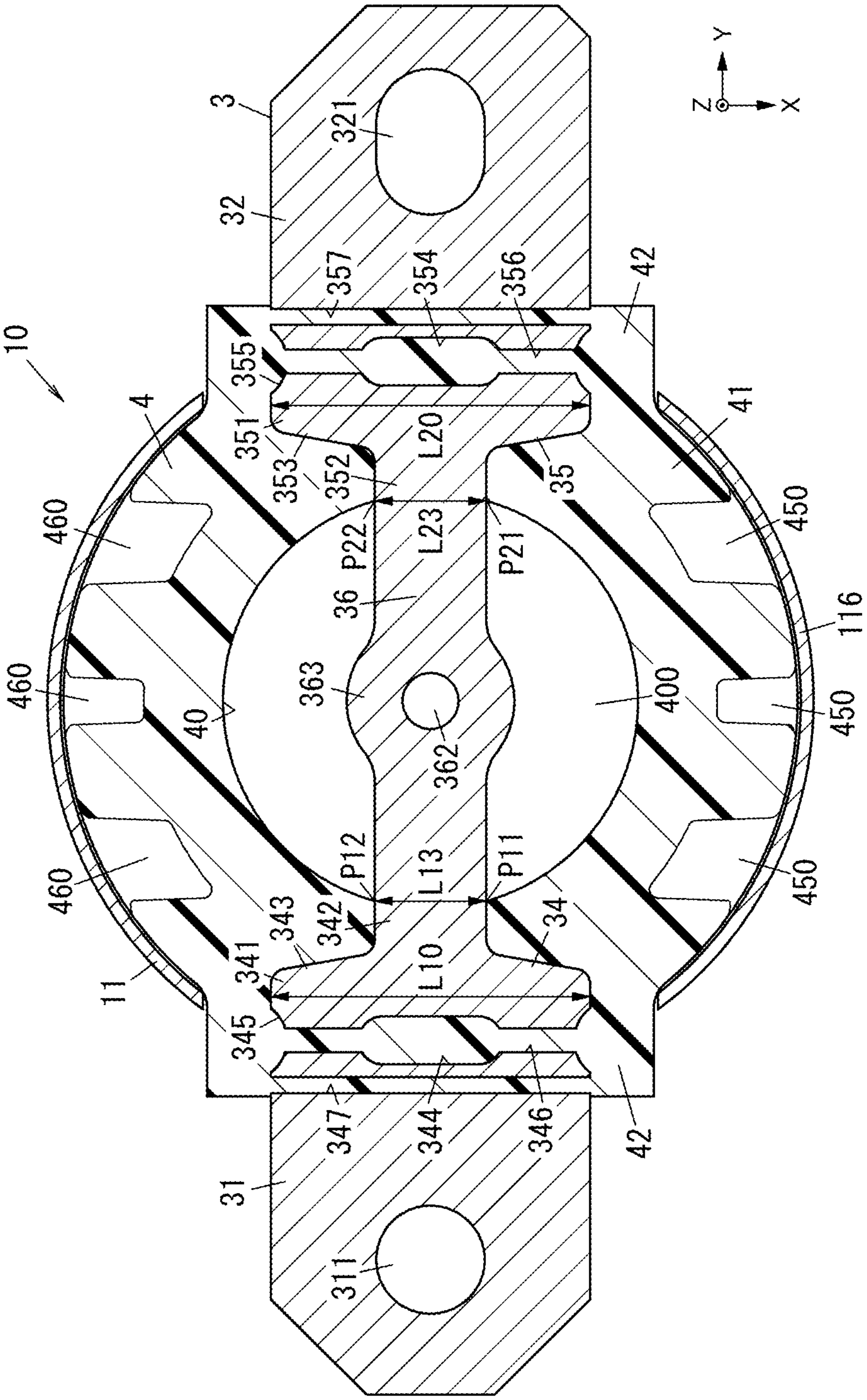
FIG. 9 is a cross-sectional view of the breaker device cut along a plane perpendicular to the Z-axis.

As illustrated in FIG. 8A and FIG. 9, first holding portion 34 includes first portion 341, second portion 342, and connecting portion 343.

First portion 341 is a portion of first holding portion 34 that is connected to first terminal portion 31. The boundary between first portion 341 and first terminal portion 31 (that is, the boundary between first holding portion 34 and first terminal portion 31) is the boundary between a portion of conductor 3 that is embedded in resin member 4 and a portion of conductor 3 that protrudes from the outer side surface of resin member 4. For example, the front-to-back dimension (length L10) of first portion 341 is constant except for an area where depressed portion 345 to be described later is provided. For example, the dimension (length L10) of first portion 341 is the same as the dimension (length) of first terminal portion 31 in the front-to-back direction.

Second portion 342 is a portion of first holding portion 34 that is connected to connecting portion 36. The boundary between second portion 342 and connecting portion 36 (that is, the boundary between first holding portion 34 and connecting portion 36) is the boundary between a portion of conductor 3 that is embedded in resin member 4 and a portion of conductor 3 that protrudes from the inner side surface of resin member 4. For example, the front-to-back dimension (length L12) of second portion 342 is constant. The dimension (length L12) of second portion 342 is smaller than the dimension (length L10) of first portion 341 in the front-to-back direction. For example, the dimension (length L12) of second portion 342 is the same as the dimension (length) of connecting portion 36 in the front-to-back direction. Furthermore, as illustrated in FIG. 7, the dimension (thickness) of second portion 342 is smaller than the dimension (thickness) of first portion 341 in the up-down direction.

Connecting portion 343 is a portion of first holding portion 34 that connects first portion 341 and second portion 342. As illustrated in FIG. 8A and FIG. 9, the front and back side surfaces of connecting portion 343 are inclined so that the front-to-back dimension of connecting portion 343 is gradually reduced from the first portion 341 end to the second portion 342 end. Furthermore, as illustrated in FIG. 7, at least one of the upper surface and the lower surface (in the present exemplary embodiment, the lower surface) of connecting portion 343 is inclined so that the up-to-down dimension (thickness) of connecting portion 343 is gradually reduced from the first portion 341 end to the second portion 342 end.

As illustrated in FIG. 8A and FIG. 9, first holding portion 34 has through-hole 344 penetrating first holding portion 34 in the up-down direction. Through-hole 344 is formed in first portion 341. Through-hole 344 is in the shape of an elongated hole that is long in the front-to-back direction. Through-hole 344 is formed at the front-to-back center of first portion 341. The dimension (length L11) of through-hole 344 is smaller than the dimension (length L10) of first portion 341 and is larger than the dimension (length L12) of second portion 342 in the front-to-back direction. The front end of through-hole 344 is located forward of the front side surface of second portion 342, and the back end of through-hole 344 is located backward of the back side surface of second portion 342. In other words, through-hole 344 is shaped so as to overlap with the entirety of second portion 342 as viewed from the left. As illustrated in FIG. 9, through-hole 344 is embedded in resin member 4.

As illustrated in FIG. 8A and FIG. 9, first holding portion 34 includes depressed portion 345. Depressed portion 345 is formed on the side surface of first holding portion 34. Depressed portion 345 is formed on the side surface of first portion 341. Depressed portion 345 is formed on at least one of the front side surface and the back side surface; in the present exemplary embodiment, depressed portion 345 is formed on each of the front side surface and the back side surface.

Depressed portion 345 is provided at a position that overlaps with through-hole 344 in the left-right direction, for example. For example, depressed portion 345 is a recess depressed from the front to the back or from the back to the front so as to be arc-shaped as viewed from above. As illustrated in FIG. 9, depressed portion 345 is embedded in resin member 4.

As illustrated in FIG. 7, FIG. 8A, and FIG. 9, first holding portion 34 includes first recessed area 346 connected to through-hole 344. First recessed area 346 is provided on at least one of the upper surface and the lower surface of first holding portion 34; in the present exemplary embodiment, first recessed area 346 is provided on each of the upper surface and the lower surface of first holding portion 34. In the present exemplary embodiment, first recessed area 346 is in the shape of a groove and extends from through-hole 344 to the front side surface or the back side surface (in the present exemplary embodiment, depressed portion 345) of first holding portion 34 in the front-to-back direction. As illustrated in FIG. 9, first recessed area 346 is embedded in resin member 4. Note that FIG. 9 is a cross-sectional view of breaker device 10 when cut midway through the depth of first recessed area 346.

As illustrated in FIG. 7, FIG. 8A, and FIG. 9, first holding portion 34 includes second recessed area 347. Second recessed area 347 is located between first recessed area 346 and first terminal portion 31 in the left-to-right direction. In other words, first recessed area 346 and through-hole 344 are located between second recessed area 347 and connecting portion 36. Second recessed area 347 is provided on at least one of the upper surface and the lower surface of first holding portion 34; in the present exemplary embodiment, second recessed area 347 is provided on each of the upper surface and the lower surface of first holding portion 34. In the present exemplary embodiment, second recessed area 347 is in the shape of a groove and extends in the front-to-back direction over the entire front-to-back length of first holding portion 34. The depth (up-to-down dimension) of second recessed area 347 is the same as the depth of first recessed area 346 in the present exemplary embodiment, but may be different from the depth of first recessed area 346. As illustrated in FIG. 9, second recessed area 347 is embedded in resin member 4.

As illustrated in FIG. 8A, a plurality of grooves 38 are formed on at least one of the upper surface and the lower surface of first holding portion 34. In other words, first holding portion 34 includes the plurality of grooves 38 on at least one of the upper surface and the lower surface. In the present exemplary embodiment, the plurality of grooves 38 are formed on each of the upper surface (refer to FIG. 8A) and the lower surface of first holding portion 34. The plurality of grooves 38 are formed by knurling, for example.

As illustrated in FIG. 8A, the plurality of grooves 38 are provided on the upper surface of first portion 341 between second recessed area 347 and connecting portion 343 and the upper surface of connecting portion 343 on the upper surface of first holding portion 34. Furthermore, the plurality of grooves 38 are provided on the lower surface of first portion 341 between second recessed area 347 and connecting portion 343 and the lower surface of connecting portion 343 on the lower surface of first holding portion 34. Grooves 38 are not provided on first recessed area 346 or second recessed area 347; this is an issue of the ease of machining, meaning that grooves 38 may be provided on at least one, for example, both, of first recessed area 346 and second recessed area 347. Furthermore, grooves 38 are not provided on the upper surface or the lower surface of second portion 342; this is an issue of the ease of machining, meaning that grooves 38 may be provided on at least one, for example, both, of the upper surface and the lower surface of second portion 342.

The plurality of grooves 38 are formed in the entire front-to-back area of first holding portion 34. The plurality of grooves 38 are embedded in resin member 4.

Figure 8B:
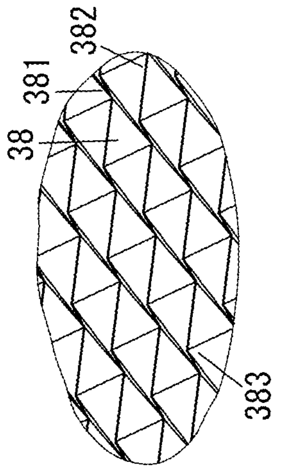
FIG. 8B is a perspective view of region E1 illustrated in FIG. 8A.

As illustrated in FIG. 8A and FIG. 8B, the plurality of grooves 38 include a plurality of first grooves 381 and a plurality of second grooves 382.

First groove 381 extends in the front-to-back direction as viewed from above (in plan view). In other words, first groove 381 extends in a direction (front-to-back direction) perpendicular to a direction in which conductor 3 extends (left-to-right direction) as viewed from above (in plan view). The plurality of first grooves 381 are parallel to each other. Note that in the present disclosure, the phrase two elements are "perpendicular" or "parallel" may mean that the two elements are exactly "perpendicular" or "parallel", but this is not limiting; for example, the two elements may be substantially perpendicular or parallel and may differ by about a few percent (or about 10%), for example.

Second groove 382 diagonally crosses a direction in which first groove 381 extends as viewed from above. In other words, second groove 382 extends in a direction diagonally crossing the direction in which conductor 3 extends (left-to-right direction). The plurality of second grooves 382 are parallel to each other. The crossing angle of the direction in which second groove 382 extends with respect to the direction in which first groove 381 extends is not particularly limited as long as the crossing angle is greater than zero degrees. This crossing angle is, for example, approximately 40 to 50 degrees in the present exemplary embodiment.

As illustrated in FIG. 8B, each of the plurality of grooves 38 has a V-shaped cross-section. In other words, a cross-section of each of the plurality of grooves 38 has a V-shape. The term "the cross-section of groove 38" refers to the external shape (cross-sectional shape) of groove 38 in a virtual plane perpendicular to the direction in which groove 38 extends. The cross-section of first groove 381 has a V-shape, and the cross-section of second groove 382 has a V-shape. With the plurality of V-shaped first grooves 381 and the plurality of V-shaped second grooves 382 which cross each other, the upper surface and the lower surface of first holding portion 34 includes multiple projections 383 each in the shape of a quadrangular pyramid, as illustrated in FIG. 8B.

(1. 3. 2) Second Holding Portion

Second holding portion 35 is a portion of conductive portion 33 that is embedded in resin member 4 and connects second terminal portion 32 and connecting portion 36. In the present exemplary embodiment, second holding portion 35 is structured such that first holding portion 34 and second holding portion 35 have mirror symmetry or two-fold rotational symmetry. Structures of second holding portion 35 that are substantially the same as those of first holding portion 34 will not be described in detail.

As illustrated in FIG. 8A and FIG. 9, second holding portion 35 includes first portion 351, second portion 352, and connecting portion 353.

First portion 351 is a portion of second holding portion 35 that is connected to second terminal portion 32. The boundary between first portion 351 and second terminal portion 32 (that is, the boundary between second holding portion 35 and second terminal portion 32) is the boundary between a portion of conductor 3 that is embedded in resin member 4 and a portion of conductor 3 that protrudes from the outer side surface of resin member 4.

Second portion 352 is a portion of second holding portion 35 that is connected to connecting portion 36. The boundary between second portion 352 and connecting portion 36 (that is, the boundary between second holding portion 35 and connecting portion 36) is the boundary between a portion of conductor 3 that is embedded in resin member 4 and a portion of conductor 3 that protrudes from the inner side surface of resin member 4.

Connecting portion 353 is a portion of second holding portion 35 that connects first portion 351 and second portion 352.

As illustrated in FIG. 7, FIG. 8A, and FIG. 9, second holding portion 35 includes through-hole 354, depressed portion 355, first recessed area 356, second recessed area 357, and a plurality of grooves 39 (including first groove 391 and second groove 392). Through-hole 354, depressed portion 355, first recessed area 356, second recessed area 357, and the plurality of grooves 39 of second holding portion 35 have substantially the same configurations as through-hole 344, depressed portion 345, first recessed area 346, second recessed area 347, and the plurality of grooves 38 of first holding portion 34. Note that second groove 392 included in the plurality of grooves 39 does not need to be structured so that second groove 382 included in grooves 38 and second groove 392 have mirror symmetry as illustrated in FIG. 8A.

When second holding portion 35 is structured so that first holding portion 34 and second holding portion 35 have mirror symmetry or two-fold rotational symmetry, it is possible to make the conduction performance of conductor 3 symmetrical. For example, it is possible to cause an electric current to flow from first terminal portion 31 to second terminal portion 32 through conductive portion 33, and it is also possible to cause an electric current to flow in the opposite direction.

(1. 3. 3) Connecting Portion

Connecting portion 36 is a portion of conductive portion 33 that is located in internal space 400 inside through-hole 40 of resin member 4. Connecting portion 36 is in the shape of a plate extending in the left-to-right direction and having a thickness in the up-to-down direction. As illustrated in FIG. 3 and FIG. 7, connecting portion 36 includes inclined surfaces 361 near both ends of the lower surface in the left-to-right direction and therefore is thinner in both left and right end areas than in a central area.

Connecting portion 36 has through-hole 362 at the center. As illustrated in FIG. 3 and FIG. 4, through-hole 362 is connected to recessed area 521 located at the center among seven recessed areas 52 on the lower surface of pusher 5. When there are through-hole 362 and recessed areas 52 (521, 522), the speed of pusher 5 that is moving downward after connecting portion 36 is cut off can be reduced due to air resistance during the interrupting operation.

Furthermore, as illustrated in FIG. 8A, bulging portion 363 which bulges outward in such a manner as to follow through-hole 362 is provided on each of front and back side surfaces of connecting portion 36 near the center thereof. With bulging portion 363, the cross-sectional area of connecting portion 36 along a plane perpendicular to the left-to-right direction (that is, a direction in which an electric current flows inside conductor 3) can be made substantially constant in an area where through-hole 362 is located and an area where through-hole 362 is not located, meaning that the conduction performance of conductor 3 can be maintained even with through-hole 362.

On the upper surface of connecting portion 36, separation groove 371 mentioned above (refer to FIG. 7 and FIG. 8A) is formed near the boundary between connecting portion 36 and first holding portion 34 along boundary line B1 (refer to FIG. 10) between connecting portion 36 and first holding portion 34 as viewed from above. In the present disclosure, the phrase "boundary line B1 between connecting portion 36 and first holding portion 34 as viewed from above" refers to a line (in the present exemplary embodiment, an arc line) between a portion of conductor 3 that is embedded in resin member 4 and a portion of conductor 3 that protrudes from resin member 4 in the upper surface of conductor 3. Furthermore, in the upper surface of connecting portion 36, separation groove 372 mentioned above (refer to FIG. 7 and FIG. 8A) is formed near the boundary between connecting portion 36 and second holding portion 35 along boundary line B2 (refer to FIG. 10) between connecting portion 36 and second holding portion 35 as viewed from above. On the lower surface of connecting portion 36, separation groove 373 mentioned above (refer to FIG. 7) is formed near the boundary between connecting portion 36 and first holding portion 34 along the boundary line between connecting portion 36 and first holding portion 34 as viewed from below. On the lower surface of connecting portion 36, separation groove 374 mentioned above (refer to FIG. 7) is formed near the boundary between connecting portion 36 and second holding portion 35 along the boundary line between connecting portion 36 and second holding portion 35 as viewed from below. As illustrated in FIG. 7, separation grooves 371 to 374 are provided at both ends of connecting portion 36 that are relatively thin.

The front-to-back dimension of connecting portion 36 in an area near the boundary between connecting portion 36 and first holding portion 34 is smaller than the front-to-back dimension of first holding portion 34. In other words, the length of first holding portion 34 is greater than length L13 (refer to FIG. 9) between first terminal portion P11 and second terminal portion P12 at boundary line B1 between connecting portion 36 and first holding portion 34. Herein, the phrase "the length of first holding portion 34" refers to the maximum front-to-back dimension of first holding portion 34, which is length L10 of first portion 341 in the present exemplary embodiment. Furthermore, the phrase "first terminal portion P11 and second terminal portion P12 at boundary line B1 between connecting portion 36 and first holding portion 34" refers to one end and the other end of arc-shaped boundary line B1 between connecting portion 36 and first holding portion 34, respectively. The phrase "length L13 between first terminal portion P11 and second terminal portion P12 at boundary line B1 between connecting portion 36 and first holding portion 34" refers to the linear distance (shortest distance) between first terminal portion P11 and second terminal portion P12.

Furthermore, the front-to-back dimension of connecting portion 36 in an area near the boundary between connecting portion 36 and first holding portion 34 is smaller than the front-to-back dimension (length L11) of through-hole 344 of first holding portion 34 (refer to FIG. 8A). In particular, length L11 of through-hole 344 of first holding portion 34 is equal to or greater than length L13 (refer to FIG. 9) between first terminal portion P11 and second terminal portion P12 at boundary line B1 between connecting portion 36 and first holding portion 34. The phrase "length L11 of through-hole 344 of first holding portion 34" refers to the maximum front-to-back dimension of through-hole 344.

Similarly, length L20 of second holding portion 35 is greater than length L23 between first terminal portion P21 and second terminal portion P22 at boundary line B1 between connecting portion 36 and second holding portion 35. Furthermore, length L21 of through-hole 354 is equal to or greater than length L23 between first terminal portion P21 and second terminal portion P22 at boundary line B2 between connecting portion 36 and second holding portion 35.

(1. 3. 4) Arc Shield Structure

There are cases where the interrupting operation of breaker device 10 is performed in the state where an electric current flows to conductor 3. When connecting portion 36 is cut off from first holding portion 34 and second holding portion 35 by the interrupting operation in the state where an electric current flows to conductor 3, there are cases where an electric arc (arc discharge) occurs between cut-off portions. Since resin member 4 is formed integrally with conductor 3, there is no spacing between resin member 4 and conductor 3 and therefore, the electric arc that has occurred basically stays within internal space 400 of resin member 4. However, when a significant amount of the electric arc occurs, a conductive gas attributed to the electric arc may leak out of casing 1 through gaps (boundary) between resin member 4 and conductor 3 (first holding portion 34 or second holding portion 35). Thus, breaker device 10 according to the present exemplary embodiment has an arc shield structure that keeps the conductive gas attributed to the electric arc from leaking out of casing 1.

The arc shield structure includes through-holes 344, 354 formed in first holding portion 34 and second holding portion 35 of conductor 3. In other words, through-holes 344, 354 of conductor 3 which are formed in first holding portion 34 and second holding portion 35 embedded in resin member 4 function as the arc shield structure.

The conductive gas (such as plasma) attributed to the electric arc that has occurred at a split or cut part between connecting portion 36 and first holding portion 34 (or second holding portion 35) attempts to move out of casing 1 by moving to the left (or to the right) through the boundary between the upper surface or the lower surface of first holding portion 34 (or second holding portion 35) and resin member 4. However, as a result of through-hole 344 (or 354) being embedded in resin member 4, the conductive gas that is moving is prevented from moving to the left (or to the right) by hitting, on the way, a wall of resin member 4 in which through-hole 344 (or 354) is embedded. Thus, the conductive gas is less likely to leak out of casing 1. Furthermore, part of the gas (such as plasma) attempts to further move to the left (or to the right) by bypassing an area of resin member 4 that corresponds to through-hole 344 (or 354), but the bypassing increases the length of the path of movement and therefore, the gas is cooled while bypassing said area and the conductivity of the gas (such as plasma) is lost. Thus, even if the gas leaks out of casing 1, the leaked gas has lost conductivity thereof, meaning that the impact on the outside world can be minimized.

The arc shield structure includes first recessed areas 346, 356 formed on first holding portion 34 and second holding portion 35 of conductor 3. In other words, first recessed areas 346, 356 of conductor 3 which are formed on first holding portion 34 and second holding portion 35 embedded in resin member 4 function as the arc shield structure.

When there are first recessed areas 346, 356, the conductive gas can be prevented from moving or can be forced to bypass the area, for example, similar to the case of through-holes 344, 354. Thus, the conductive gas attributed to the electric arc can be kept from leaking out of casing 1.

Furthermore, since first recessed areas 346, 356 are connected to through-holes 344, 354, portions of resin member 4 that are located in first recessed areas 346, 356 are connected to portions of resin member 4 that are located in through-holes 344, 354. This means that when there are first recessed areas 346, 356, the strength of resin member 4 in through-holes 344, 354 can be improved.

Note that first recessed area 346 (or 356) preferably extends from through-hole 344 (or 354) to the front side surface or the back side surface of first holding portion 34 (or second holding portion 35), but does not necessarily need to extend to the front side surface or the back side surface.

The arc shield structure includes second recessed areas 347, 357 formed on first holding portion 34 and second holding portion 35 of conductor 3. In other words, second recessed areas 347, 357 of conductor 3 which are formed on first holding portion 34 and second holding portion 35 embedded in resin member 4 function as the arc shield structure.

When there are second recessed areas 347, 357, the conductive gas can be prevented from moving or can be forced to bypass the area, for example, similar to the case of first recesses 346, 356. Thus, the conductive gas attributed to the electric arc can be kept from leaking out of casing 1.

Note that second recessed area 347 (or 357) is preferably formed over the entire front-to-back length of first holding portion 34 (or second holding portion 35), but may be formed on only a part of the entire front-to-back length of first holding portion 34 (or second holding portion 35). In this case, second recessed area 347 (or 357) may be provided in at least an area that does not overlap with through-hole 344 (or 354) as viewed from the left or the right.

The arc shield structure includes depressed portions 345, 355 formed on first holding portion 34 and second holding portion 35 of conductor 3. In other words, depressed portions 345, 355 formed on first holding portion 34 and second holding portion 35 of conductor 3 that are embedded in resin member 4 function as the arc shield structure.

The conductive gas (such as plasma) attributed to the electric arc that has occurred at a split or cut part between connecting portion 36 and first holding portion 34 (or second holding portion 35) attempts to move out of casing 1 through the boundary between the front side surface or the back side surface of first holding portion 34 (or second holding portion 35) and resin member 4. However, when there are depressed portions 345 (or 355) on the front side surface and the back side surface of first holding portion 34 (or second holding portion 35), the conductive gas can be prevented from moving or can be forced to bypass the area, for example, similar to the case of first recessed areas 346, 356 and the like. Thus, the gas is less likely to leak out of casing 1 and moreover, cooling of the gas is promoted, meaning that the conductive gas attributed to the electric arc can be kept from leaking out of casing 1.

The arc shield structure includes the plurality of grooves 38, 39 formed on first holding portion 34 and second holding portion 35 of conductor 3. In other words, the plurality of grooves 38, 39 formed on first holding portion 34 and second holding portion 35 of conductor 3 that are embedded in resin member 4 function as the arc shield structure.

When there are grooves 38, 39, the conductive gas can be prevented from moving or the travel distance of the conductive gas can be increased, for example, similar to the case of first recessed areas 346, 356 and the like. Thus, the gas is less likely to leak out of casing 1 and moreover, cooling of the gas is promoted, meaning that the conductive gas attributed to the electric arc can be kept from leaking out of casing 1. In particular, each of grooves 38, 39 preferably has a V-shaped cross-section from the perspective of the ease of machining and the perspective of increasing the travel distance.

Furthermore, when there are the plurality of grooves 38, 39 on first holding portion 34 and second holding portion 35 of conductor 3, resin member 4 fits more precisely with conductor 3 at the time of forming resin member 4 integrally with conductor 3, meaning that the adhesion of resin member 4 with conductor 3 can be improved. Therefore, the conductive gas attributed to the electric arc can be further prevented from leaking out of casing 1.

(1. 4) Details of Resin Member

Next, details of resin member 4 in breaker device 10 according to the present exemplary embodiment will be described with reference to FIG. 3, FIG. 4, and FIG. 10 to FIG. 12.

As described above, resin member 4 includes cylindrical body portion 41 and the pair of protruding portions 42. Resin member 4 is formed integrally with conductor 3 by insert molding, for example.

Figure 10:
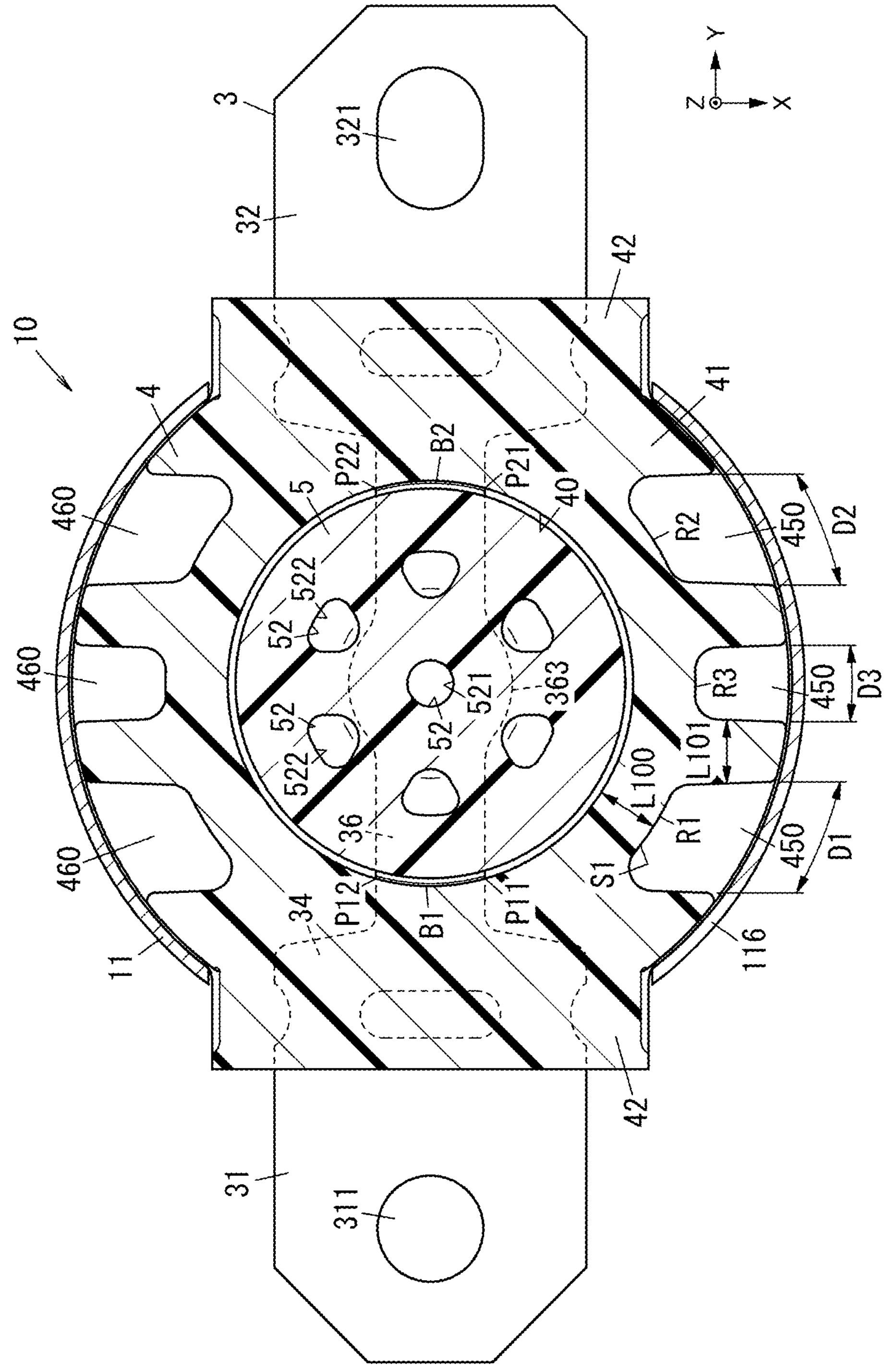
FIG. 10 is a cross-sectional view of the breaker device cut along a plane perpendicular to the Z-axis, at a level different from that in FIG. 9.

As illustrated in FIG. 3, FIG. 4, and FIG. 10, in cylindrical body portion 41 of resin member 4, through-hole 40 is formed extending through cylindrical body portion 41 along the axis thereof. The inner side surface of through-hole 40 is a cylindrical surface.

Figure 11:
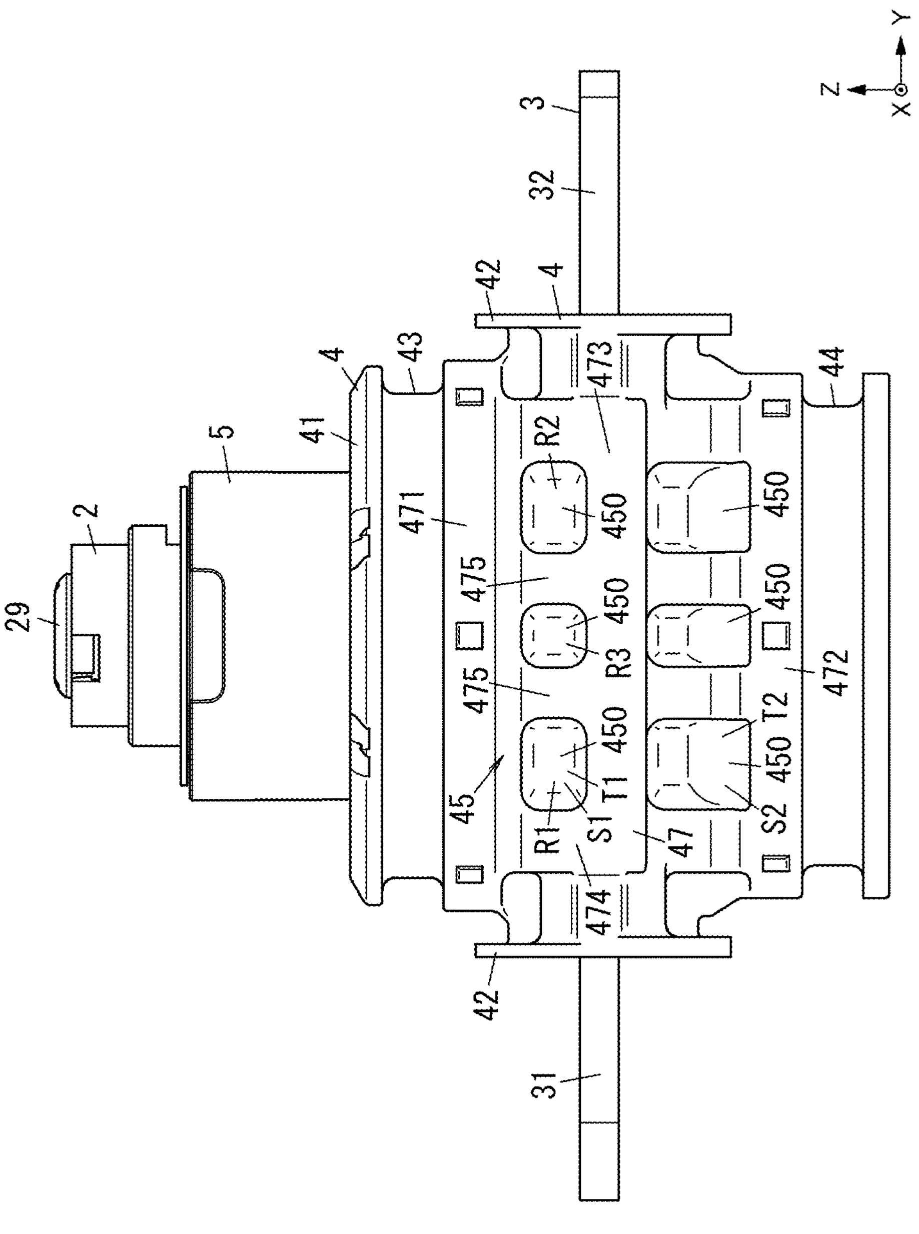
FIG. 11 is a front view of main components of the breaker device.
Figure 12:
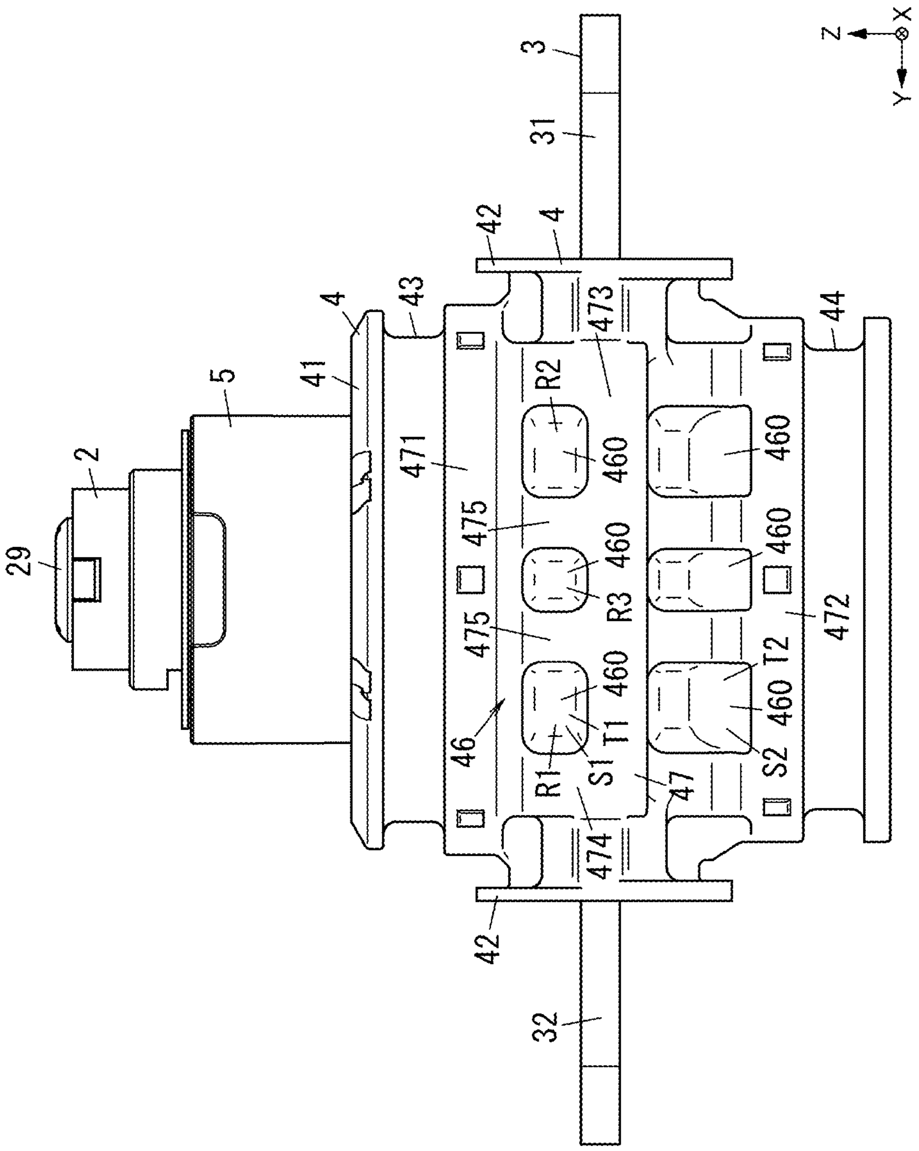
FIG. 12 is a rear view of main components of the breaker device.

As illustrated in FIG. 11 and FIG. 12, on the outer side surface of cylindrical body portion 41, first housing groove 43 is formed into a ring shape near the upper end, and second housing groove 44 is formed into a ring shape near the lower end.

Cylindrical body portion 41 has been lightened. Thus, first recess group 45 and second recess group 46 are provided on the outer side surface of cylindrical body portion 41, as illustrated in FIG. 11 and FIG. 12. First recess group 45 and second recess group 46 are provided in regions on the outer side surface of cylindrical body portion 41 from which conductor 3 does not protrude.

As illustrated in FIG. 11, resin member 4 includes first recess group 45. First recess group 45 includes a plurality of first recesses 450. First recess group 45 is provided in a front region on the outer side surface of cylindrical body portion 41. Furthermore, as illustrated in FIG. 12, resin member 4 includes second recess group 46. Second recess group 46 includes a plurality of second recesses 460. Second recess group 46 is provided in a back region on the outer side surface of cylindrical body portion 41.

(1. 4. 1) First Recess Group

As mentioned above, first recess group 45 is provided in the front region on the outer side surface of cylindrical body portion 41.

First recess group 45 includes m×n first recesses 450 as the plurality of first recesses 450. Here, "m" is a natural number greater than or equal to 2, and "n" is a natural number greater than or equal to 1. As viewed from the front, m×n first recesses 450 in first recess group 45 are arranged in a matrix with m rows and n columns. Here, "m" represents the number of rows of first recesses 450 arranged in the up-to-down direction, and "n" represents the number of columns of first recesses 450 arranged in the left-to-right direction. Specifically, first recess group 45 includes the plurality of (m×n) first recesses 450 aligned so as to have two or more rows thereof in the up-to-down direction and one or more columns thereof in the left-to-right direction.

As illustrated in FIG. 10, each of the plurality of first recesses 450 is a recess that does not penetrate resin member 4. The depth of each of the plurality of first recesses 450 is set so that the dimension between the bottom surface of first recess 450 and the inner side surface of through-hole 40 (thickness L100 indicated in FIG. 10) becomes greater than or equal to a predetermined thickness. This "predetermined thickness" may be the minimum dimension required for resin member 4 to have strength such that resin member 4 does not suffer damage even when an anomaly such as an accident occurs in an object on which breaker device 10 is mounted or when breaker device 10 performs the interrupting operation, for example. The bottom surface of each of the plurality of first recesses 450 is curved as a cylindrical surface so as to follow the inner bottom surface of through-hole 40.

Each of the plurality of first recesses 450 is formed so as to be depressed backward from the outer side surface of resin member 4 along the X-axis. Therefore, the left-to-right dimension (thickness L101) of a wall portion of resin member 4 that is located between first recesses 450 adjacent to each other in the left-to-right direction (refer to FIG. 10) is substantially constant in the front-to-back direction. Thus, the strength of the wall portion can improve.

The plurality of first recesses 450 are formed so that the breadths of first recesses 45 belonging to the same column (for example, the breadths of two first recesses 450 in the far left column) become the same. In the present exemplary embodiment, the phrase "the breadth of first recesses 450" is the length of a virtual line connecting the left end and the right end of an opening plane of first recess 450 along the curved shape of the outer side surface of cylindrical body portion 41. The phrase "the opening plane of first recess 450" refers to a virtual plane connecting the left and right opening edges of first recess 450 along the curved shape of the outer side surface of cylindrical body portion 41.

The plurality of first recesses 450 are formed so that the height of lower first recess 450 among first recesses 450 belonging the same column is greater. In the present exemplary embodiment, the phrase "the height of first recess 450" refers to the length of a virtual line connecting the upper end and the lower end of the opening plane of first recess 450.

As illustrated in FIG. 11, the plurality of first recesses 450 are formed at positions offset from conductor 3 in the up-to-down direction. In the present disclosure, the phrase "the plurality of first recesses 450 are formed at positions offset from conductor 3 in the up-to-down direction" may indicate that as viewed from the front (that is, as viewed in a direction perpendicular to the up-to-down direction), the entirety of conductor 3 does not overlap with first recesses 450 or at least a portion of conductor 3 (for example, at least a half thereof in the up-to-down direction) does not overlap with first recesses 450. In the present exemplary embodiment, at least a lower half of conductor 3 does not overlap with any of first recesses 450 as viewed from the front.

As illustrated in FIG. 11, m×n first recesses 450 include first predetermined recess R1, second predetermined recess R2, and third predetermined recess R3. First predetermined recess R1 is first recess 450 adjacent to first terminal portion 31 of conductor 3 among m×n first recesses 450 arranged in the matrix with m rows and n columns. Second predetermined recess R2 is first recess 450 adjacent to second terminal portion 32 of conductor 3 among m×n first recesses 450 arranged in the matrix with m rows and n columns. Third predetermined recess R3 is first recess 450 located between first predetermined recess R1 and second predetermined recess R2 among m×n first recesses 450 arranged in the matrix with m rows and n columns. Note that in the present disclosure, when the "predetermined recess" is mentioned, the number of columns "n" may be a natural number greater than or equal to 3.

For example, first predetermined recess R1 is one of m first recesses 450 in the first column located closest to first terminal portion 31 among m×n first recesses 450. Second predetermined recess R2 is first recess 450 located in the same row as first predetermined recess R1 among m first recesses 450 in the n-th column closest to second terminal portion 32 (farthest from first terminal portion 31). Third predetermined recess R3 is one of (n−2) first recesses 450 located in the same row as first predetermined recess R1 and second predetermined recess R2 among m×(n−2) first recesses 450 in the second to (n−1)-th column.

In the present exemplary embodiment, each of the volume of first predetermined recess R1 and the volume of second predetermined recess R2 is greater than the volume of third predetermined recess R3. In other words, the volume of first predetermined recess R1 is greater than the volume of third predetermined recess R3, and the volume of second predetermined recess R2 is greater than the volume of third predetermined recess R3. The phrase "the volume of first recess 450 (each of first predetermined recess R1 to third predetermined recess R3)" refers to the volume (capacity) of the space surrounded by the opening plane and the inner surface (the inner bottom surface and the inner side surface) of first recess 450.

Furthermore, each of breadth D1 of first predetermined recess R1 and breadth D2 of second predetermined recess R2 is greater than breadth D3 of third predetermined recess R3. In other words, breadth D1 of first predetermined recess R1 is greater than breadth D3 of third predetermined recess R3, and breadth D2 of second predetermined recess R2 is greater than breadth D3 of third predetermined recess R3. The terms "breadth D1 of first predetermined recess R1," "breadth D2 of second predetermined recess R2," and "breadth D3 of third predetermined recess R3" refer to the widths of first predetermined recess R1, second predetermined recess R2, and third predetermined recess R3 in the direction of alignment thereof. In the present exemplary embodiment, first predetermined recess R1, second predetermined recess R2, and third predetermined recess R3 are arranged along the curved shape of the outer side surface of cylindrical body portion 41. Therefore, in the present exemplary embodiment, the phrase "breadths D1 to D3 of first to third predetermined recesses R1 to R3 in the direction of alignment of first predetermined recess R1, second predetermined recess R2, and third predetermined recess R3" refers to the dimensions of first to third predetermined recesses R1 to R3 along the curved shape of the outer side surface of cylindrical body portion 41 in the direction of alignment of first predetermined recess R1, second predetermined recess R2, and third predetermined recess R3 (in the present exemplary embodiment, the circumferential direction of the outer side surface of cylindrical body portion 41) (refer to FIG. 10).

Note that when the number of columns "n" is greater than or equal to 4, there may be two or more third predetermined recesses R3 between first predetermined recess R1 and second predetermined recess R2. In this case, it is sufficient that the volume of at least one third predetermined recess R3 among two or more third predetermined recesses R3 be smaller than the volume of each of first predetermined recess R1 and second predetermined recess R2. Furthermore, it is sufficient that breadth D3 of at least one third predetermined recess R3 among two or more third predetermined recesses R3 be less than each of breadth D1 of first predetermined recess R1 and breadth D2 of second predetermined recess R2. It goes without saying that the volume (or breadth D3) of each of two or more third predetermined recesses R3 may be smaller than the volume (or breadth D1) of first predetermined recess R1 and smaller than the volume (or breadth D2) of second predetermined recess R2.

In the present exemplary embodiment, the number of rows "m" is "2", and the number of columns "n" is "3." Specifically, as illustrated in FIG. 11, first recess group 45 includes 2×3 (=6) first recesses 450. First recess group 45 is a matrix with two rows and three columns.

Here, 2×3 first recesses 450 include: first predetermined recess R1 which is first recess 450 disposed at row 1 and column 1; second predetermined recess R2 which is first recess 450 disposed at row 1 and column 3; and third predetermined recess R3 which is first recess 450 disposed at row 1 and column 2. The volume of first predetermined recess R1 is greater than the volume of the third predetermined recess. The volume of second predetermined recess R2 is greater than the volume of third predetermined recess R3. Furthermore, breadth D1 of first predetermined recess R1 is greater than breadth D3 of third predetermined recess R3. Breadth D2 of second predetermined recess R2 is greater than breadth D3 of third predetermined recess R3.

From another perspective, first recess group 45 includes 2×3 first recesses 450 arranged in a matrix with two rows and three columns, as illustrated in FIG. 11. Here, 2×3 first recesses 450 include first prescribed recess S1 and second prescribed recess S2. First prescribed recess S1 is first recess 450 disposed at row 1 and column 1 among 2×3 first recesses 450. Second prescribed recess S2 is first recess 450 disposed at row 2 and column 1 among 2×3 first recesses 450. Second prescribed recess S2 is located at a level below first prescribed recess S1.

In the present exemplary embodiment, the volume of first prescribed recess S1 is smaller than the volume of second prescribed recess S2. Furthermore, the height of first prescribed recess S1 is less than the height of second prescribed recess S2. Here, "the height of first prescribed recess S1" and "the height of second prescribed recess S2" refer to the widths of first prescribed recess S1 and second prescribed recess S2 in the direction of alignment thereof.

(1. 4. 2) Thicker Portion

Cylindrical body portion 41 of resin member 4 includes, in a front region on the outer side surface, a portion on which first recess 450 is not provided (hereinafter referred to as "thicker portion 47").

More specifically, m×n first recesses 450 include upper recess T1 and lower recess T2, as illustrated in FIG. 11. Upper recess T1 is first recess 450 at a position offset upward from conductor 3. Lower recess T2 is first recess 450 at a position offset downward from conductor 3.

For example, upper recess T1 is one of one or more first recesses 450 at positions offset upward from conductor 3. Lower recess T2 is first recess 450 located below upper recess T1 among one or more first recesses 450 at positions offset downward from conductor 3.

For example, upper recess T1 may be one of n first recesses 450 in the first row which is the top row among m×n first recesses 450 arranged in the matrix with m rows and n columns. Lower recess T2 may be first recess 450 in the same column as upper recess T1 among n first recesses 450 in the m-th row which is the bottom row (in the present exemplary embodiment, the second row).

In the present exemplary embodiment, as one example, upper recess T1 is first recess 450 located at row 1 and column 1 among 2×3 first recesses 450 arranged in the matrix with two rows and three columns. Lower recess T2 is first recess 450 located at row 2 and column 1.

Thicker portion 47 includes first thicker portion 471 to third thicker portion 473.

First thicker portion 471 is a part of cylindrical body portion 41 that is located at a level above upper recess T1. First thicker portion 471 is in the shape of a ring having a thickness in the radial direction of cylindrical body portion 41. First thicker portion 471 is located at a level above the entirety of m×n first recesses 450. First thicker portion 471 is located at a level below first housing groove 43. In other words, first thicker portion 471 is located between first housing groove 43 and first recess group 45 in the up-to-down direction.

Second thicker portion 472 is a part of cylindrical body portion 41 that is located at a level below lower recess T2. Second thicker portion 472 is in the shape of a ring having a thickness in the radial direction of cylindrical body portion 41. Second thicker portion 472 is located at a level below the entirety of m×n first recesses 450. Second thicker portion 472 is located at a level above second housing groove 44. In other words, second thicker portion 472 is located between second housing groove 44 and first recess group 45 in the up-to-down direction.

Third thicker portion 473 is a part of cylindrical body portion 41 that is located between upper recess T1 and lower recess T2. Third thicker portion 473 is in the shape of a ring having a thickness in the radial direction of cylindrical body portion 41. Third thicker portion 473 is located at a level below n first recesses 450 in the first row and above n first recesses 450 in the m-th row among m×n first recesses 450 arranged in the matrix with m rows and n columns.

As illustrated in FIG. 4, the thickness of third thicker portion 473 is greater than the thickness of first thicker portion 471 and is greater than the thickness of second thicker portion 472. In the present exemplary embodiment, the inner diameter of first thicker portion 471 and the inner diameter of third thicker portion 473 are equal and are less than the inner diameter of second thicker portion 472, as illustrated in FIG. 4.

Each of outer diameter A1 of first thicker portion 471 and outer diameter A2 of second thicker portion 472 is less than outer diameter A3 of third thicker portion 473. In other words, each of outer diameter A1 of a portion (first thicker portion 471) of resin member 4 that is located at a level above upper recess T1 and outer diameter A2 of a portion (second thicker portion 472) of resin member 4 that is located at a level below lower recess T2 is less than outer diameter A3 of a portion (third thicker portion 473) of resin member 4 that is located between upper recess T1 and lower recess T2.

In addition, as illustrated in FIG. 11, thicker portion 47 further includes fourth thicker portion 474. Fourth thicker portion 474 is a part of cylindrical body portion 41 that is located between first recess group 45 and conductor 3 in the left-to-right direction.

Thicker portion 47 further includes fifth thicker portion 475. Fifth thicker portion 475 is a part of cylindrical body portion 41 that is located between two first recesses 450 adjacent to each other in the left-to-right direction (that is, in the same row). When the number of columns "n" is "1," there is no fifth thicker portion 475.

(1. 4. 3) Advantageous Effects Produced by First Recess Group

As mentioned above, when breaker device 10 performs the interrupting operation, an electric arc may occur inside internal space 400 of resin member 4. Therefore, resin member 4 needs to have pressure capacity to withstand against the electric arc. It is conceivable to increase the thickness of resin member 4 in order to increase the pressure capacity to withstand against the electric arc. However, an increase in the overall thickness of resin member 4 leads to an increase in the amount of resin material required to form resin member 4. Furthermore, an increase in the overall thickness of resin member 4 may make it more likely that voids will be formed in resin member 4, for example, which means degraded formability, causing the pressure capacity to withstand against the electric arc to be reduced on the contrary. In view of this, in breaker device 10 according to the present exemplary embodiment, first recess group 45 including m×n first recesses 450 arranged in the matrix with m rows and n columns is provided on resin member 4 to reduce the amount of resin member while maintaining the strength of resin member 4.

Specifically, when at least one first recess 450 is provided in the front region on the outer side surface of resin member 4, resin member 4 includes a relatively thin portion (where first recess 450 is provided) and a relatively thick portion (where first recess 450 is not provided; thicker portion 47). This makes it possible to minimize a degradation in the formability of resin member 4, minimize generation of voids in resin member 4, and improve the strength of resin member 4. Furthermore, as compared to the case where no first recess 450 is provided, the amount of resin material required to form resin member 4 can be reduced.

In particular, providing first recess 450 in the front region on the outer side surface of resin member 4 results in formation of a relatively thick portion (fourth thicker portion 474) in left and right regions on the outer side surface of resin member 4 (regions from which conductor 3 protrudes). The left and right regions on resin member 4 are portions of resin member 4 that hold conductor 3 and are most susceptible to force from conductor 3 at the time when connecting portion 36 is cut off from first holding portion 34 and second holding portion 35. Therefore, with fourth thicker portion 474 in this region, resin member 4 can be less likely to be damaged when conductor 3 is split or cut.

Furthermore, when the plurality of first recesses 450 are arranged in the matrix with m rows and n columns (where m is a natural number greater than or equal to 2), a wall portion extending in the left-to-right direction such as third thicker portion 473 is formed. When the number of columns "n" is greater than or equal to "2," a wall portion extending in the up-to-down direction such as fifth thicker portion 475 is formed. Thus, as compared to the case where the plurality of first recesses 450 are randomly arranged, the strength of resin member 4 can be improved.

In particular, when m is a natural number greater than or equal to 2, third thicker portion 473 is formed between upper recess T1 and lower recess T2. This makes it possible to further improve the strength of resin member 4.

Furthermore, when the thickness (radial dimension) of third thicker portion 473 is set greater than each of the thickness of first thicker portion 471 and the thickness of second thicker portion 472, it is possible to improve the strength of a portion of resin member 4 that is most susceptible to force from conductor 3 at the time when connecting portion 36 is cut off from first holding portion 34 and second holding portion 35. Moreover, it is possible to further improve the pressure capacity to withstand against the electric arc because third thicker portion 473 is a portion of resin member 4 that is also most susceptible to pressure from the electric arc.

In particular, when third thicker portion 473 is disposed so as to overlap with conductor 3 as viewed from the front, the strength of resin member 4 can be further improved.

Furthermore, when each of the volume of first predetermined recess R1 and the volume of second predetermined recess R2 is set greater than the volume of third predetermined recess R3 (in other words, the volume of the space inside third predetermined recess R3 is set relatively small), it is possible to improve the strength of a portion of resin member 4 that is located around third predetermined recess R3 and relatively close to igniter 2 and to which great pressure is likely to be applied. Moreover, when each of breadth D1 of first predetermined recess R1 and breadth D2 of second predetermined recess R2 is set greater than breadth D3 of third predetermined recess R3 (in other words, breadth D3 of third predetermined recess R3 is set relatively small), it is possible to improve the strength of a portion of resin member 4 that is located around third predetermined recess R3 and relatively close to igniter 2 and to which great pressure is likely to be applied.

Furthermore, when the volume of first prescribed recess S1 is set smaller than the volume of second prescribed recess S2, it is possible to improve the strength of a portion of resin member 4 that is located around first prescribed recess S1 and relatively close to igniter 2 and to which great pressure is likely to be applied. Moreover, when the height of first prescribed recess S1 is set smaller than the height of second prescribed recess S2, it is possible to improve the strength of a portion of resin member 4 that is located around first prescribed recess S1 and relatively close to igniter 2 and to which great pressure is likely to be applied.

Furthermore, in breaker device 10 according to the present exemplary embodiment, first recess group 45 faces the inner side surface of casing 1, as illustrated in FIG. 4, FIG. 10, etc. In other words, casing 1 is disposed so as to face a portion of resin member 4 in which first recess 450 is formed and that has relatively low strength. This makes it possible to reinforce resin member 4 by casing 1 and improve the mechanical strength of breaker device 10.

In particular, in breaker device 10 according to the present exemplary embodiment, at least one first recess 450 (three first recesses 450 in the second row in the present exemplary embodiment) among m×n first recesses 450 faces a region where first joining portion 116 of upper casing 11 and second joining portion 124 of lower casing 12 overlap, as illustrated in FIG. 4. In other words, a portion of casing 1 that has relatively high strength (a portion in which first joining portion 116 of upper casing 11 and second joining portion 124 of lower casing 12 overlap) is disposed so as to face a portion of resin member 4 in which first recess 450 is formed and that has relatively low strength. This makes it possible to reinforce resin member 4 by casing 1 and improve the mechanical strength of breaker device 10.

Furthermore, as illustrated in FIG. 4, the upper end of lower casing 12 is in contact with the inner side surface of at least one first recess 450 (three first recesses 450 in the second row in the present exemplary embodiment) among m×n first recesses 450. This makes it possible to reinforce resin member 4 by casing 1 and improve the mechanical strength of breaker device 10.

(1. 4. 4) Second Recess Group

As mentioned above, second recess group 46 is provided in the back region on the outer side surface of cylindrical body portion 41.

Second recess group 46 includes m×n second recesses 460 as the plurality of second recesses 460. This means that second recess group 46 includes the same number (m×n) of second recesses 360 as the number of first recesses 450 included in first recess group 45. As viewed from behind, m×n second recesses 460 in second recess group 46 are arranged in a matrix with m rows and n columns.

As mentioned above, first recess group 45 is provided in the front region on the outer side surface of cylindrical body portion 41, and second recess group 46 is provided in the back region on the outer side surface of cylindrical body portion 41; therefore, conductor 3 is located between first recess group 45 and second recess group 46. As illustrated in FIG. 10 to FIG. 12, first recess group 45 and second recess group 46 are located on the opposite sides of conductor 3. In the present exemplary embodiment, particularly, first recess group 45 and second recess group 46 are provided so as to have line symmetry as viewed from above. As a result, resin member 4 is less likely to include a weak portion as compared to the case where only first recess group 45 is formed in resin member 4.

For m×n second recesses 460 included in second recess group 46, similar to first recesses 450, first predetermined recess R1 to third predetermined recess R3, first prescribed recess S1, second prescribed recess S2, upper recess T1, and lower recess T2 may be set. Note that since second recess group 46 is formed so that first recess group 45 and second recess group 46 have line symmetry (mirror symmetry), detailed description of the position, shape, effects, etc., of second recess group 46 will be omitted.

In breaker device 10 according to the present exemplary embodiment, in addition to first recess group 45, second recess group 46 is provided in resin member 4, making it possible to further reduce the amount of resin material required to form resin member 4 while maintaining the strength of resin member 4.

(2) Variations

The exemplary embodiment described above is merely one of various exemplary embodiments of the present disclosure. Various changes can be made to the above-described exemplary embodiment according to the design or the like as long as the object of the present disclosure can be achieved. The following shows variations of the exemplary embodiment. The above-described exemplary embodiment and the variations described below can be combined and applied, as appropriate. In the description of each of the following variations, description of elements that are substantially the same as those of breaker device 10 according to the above-described exemplary embodiment may be omitted, as appropriate.

(2. 1) Variation 1

Figure 13A:
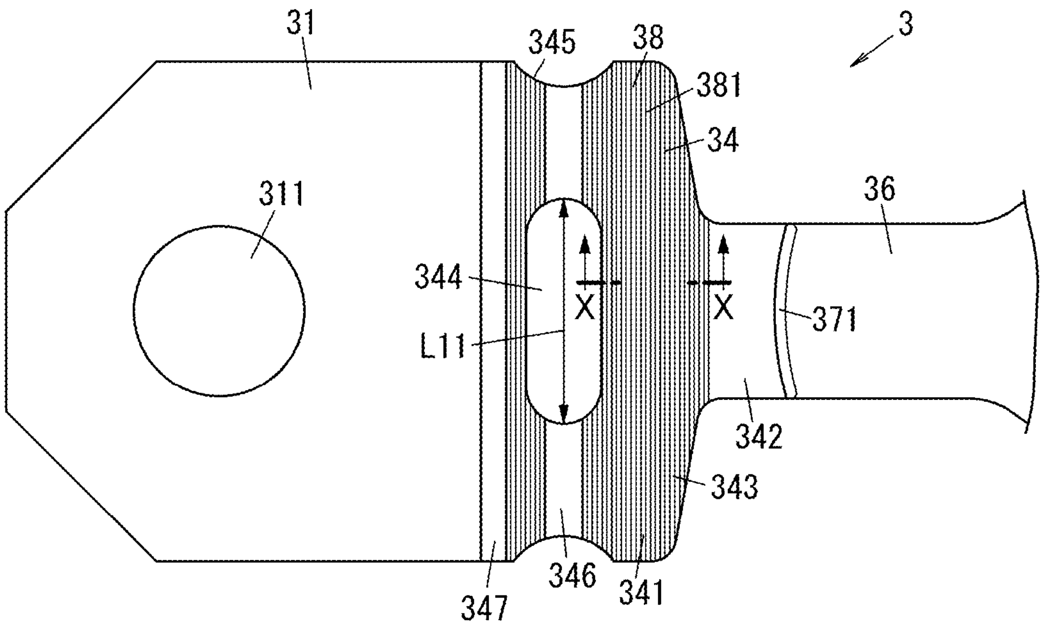
FIG. 13A is a top view of main components of a conductor included in a breaker device according to Variation 1.

In breaker device 10 according to the present variation, the plurality of grooves 38 provided on at least one (for example, both) of the upper surface and the lower surface of first holding portion 34 of conductor 3 include only first grooves 381, as illustrated in FIG. 13A. This means that as viewed from above, the plurality of grooves 38 (the plurality of first grooves 381) extend in the direction (front-to-back direction) perpendicular to the direction in which conductor 3 extends (left-to-right direction). Furthermore, although illustration has been omitted, in breaker device 10 according to the present variation, the plurality of grooves 39 provided on at least one (for example, both) of the upper surface and the lower surface of second holding portion 35 of conductor 3 include only first grooves 391. As viewed from above, the plurality of grooves 39 (the plurality of first grooves 391) extend in the direction (front-to-back direction) perpendicular to the direction in which conductor 3 extends (left-to-right direction).

Figure 13B:
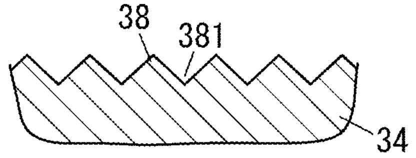
FIG. 13B is a perspective view cut along line X-X in FIG. 13A.

As illustrated in FIG. 13B, each of the plurality of grooves 38 (the plurality of first grooves 381) has a V-shaped cross-section. Each of the plurality of grooves 39 (the plurality of first grooves 391) has a V-shaped cross-section.

Even in breaker device 10 according to the present variation, the conductive gas attributed to the electric arc can be kept from leaking out of casing 1.

(2. 2) Variation 2

Figure 14:
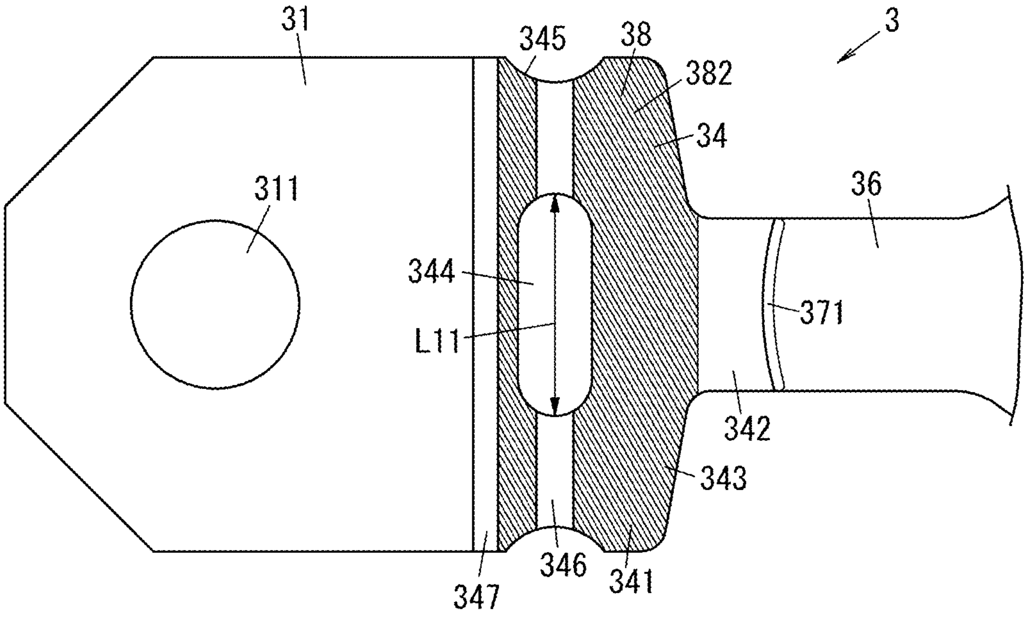
FIG. 14 is a top view of main components of a conductor included in a breaker device according to Variation 2.

In breaker device 10 according to the present variation, the plurality of grooves 38 provided on at least one (for example, both) of the upper surface and the lower surface of first holding portion 34 of conductor 3 include only second grooves 382, as illustrated in FIG. 14. This means that as viewed from above, the plurality of grooves 38 (the plurality of second grooves 382) extend in a direction diagonally crossing the direction in which conductor 3 extends (left-to-right direction). Furthermore, although illustration has been omitted, in breaker device 10 according to the present variation, the plurality of grooves 39 provided on at least one (for example, both) of the upper surface and the lower surface of second holding portion 35 of conductor 3 include only second grooves 392. As viewed from above, the plurality of grooves 39 (the plurality of second grooves 392) extend in a direction diagonally crossing the direction in which conductor 3 extends (left-to-right direction).

In the present variation, each of the plurality of grooves 38 (the plurality of second grooves 382) has a V-shaped cross-section, and each of the plurality of grooves 39 (the plurality of second grooves 392) has a V-shaped cross-section.

Even in breaker device 10 according to the present variation, the conductive gas attributed to the electric arc can be kept from leaking out of casing 1.

Note that the plurality of grooves 38 (or 39) provided on the first holding portion 34 (or second holding portion 35) of conductor 3 may be different for the upper surface and the lower surface. For example, the plurality of first grooves 381 (or 391) may be provided on the upper surface of first holding portion 34 (or second holding portion 35), and the plurality of second grooves 382 (or 392) may be provided on the lower surface of first holding portion 34 (or second holding portion 35). The plurality of grooves 38 provided on first holding portion 34 and the plurality of grooves 39 provided on second holding portion 35 may be different. For example, only first grooves 381 may be provided on first holding portion 34, and only second grooves 392 may be provided on second holding portion 35.

(2. 3) Variation 3

Figure 15:
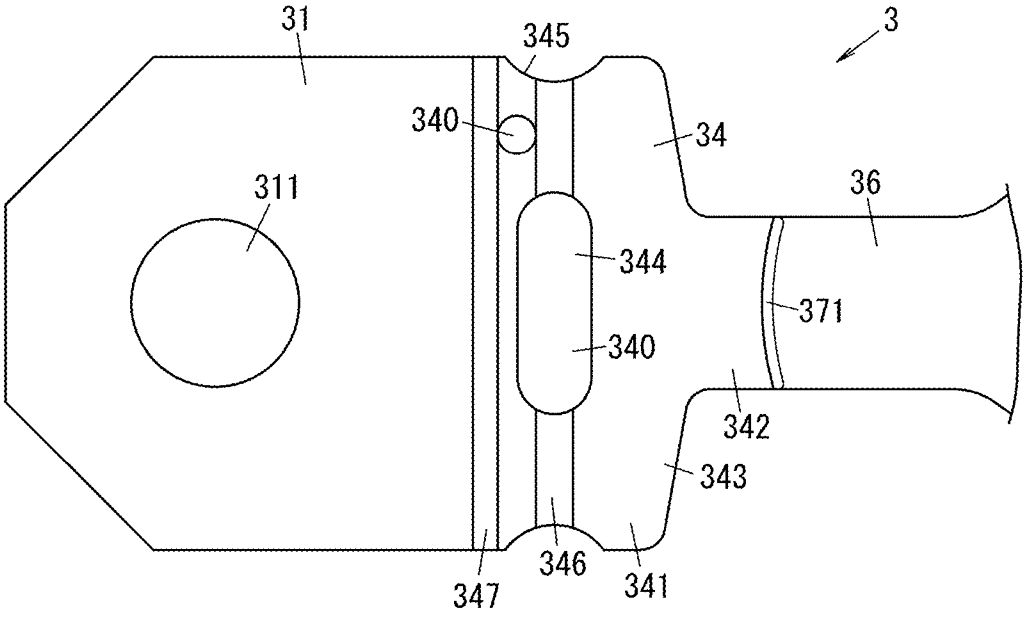
FIG. 15 is a top view of main components of a conductor included in a breaker device according to Variation 3.

In breaker device 10 according to the present variation, first holding portion 34 includes a plurality of through-holes 340, as illustrated in FIG. 15. Through-hole 344 according to the above-described exemplary embodiment is one of the plurality of through-holes 340. In other words, first holding portion 34 further includes one or more through-holes 340 in addition to through-hole 344 according to the above-described exemplary embodiment. Through-holes 340 different from through-hole 344 are also embedded in resin member 4. Through-holes 340 different from through-hole 344 are circular.

As illustrated in FIG. 15, through-holes 340 different from through-hole 344 are formed at positions that partially overlap with through-hole 344 as viewed from the front (as viewed from the front in the X-axis).

In breaker device 10 according to the present variation, as a result of first holding portion 34 including the plurality of through-holes 340, the conductive gas attributed to the electric arc can be more easily prevented from leaking out of casing 1. In other words, the plurality of through-holes 340 function as an arc shield structure that prevents the conductive gas attributed to the electric arc from leaking out of casing 1.

Note that second holding portion 35 may also include a plurality of through-holes similar to the plurality of through-holes 340 of first holding portion 34.

(2. 4) Variation 4

Figure 16:
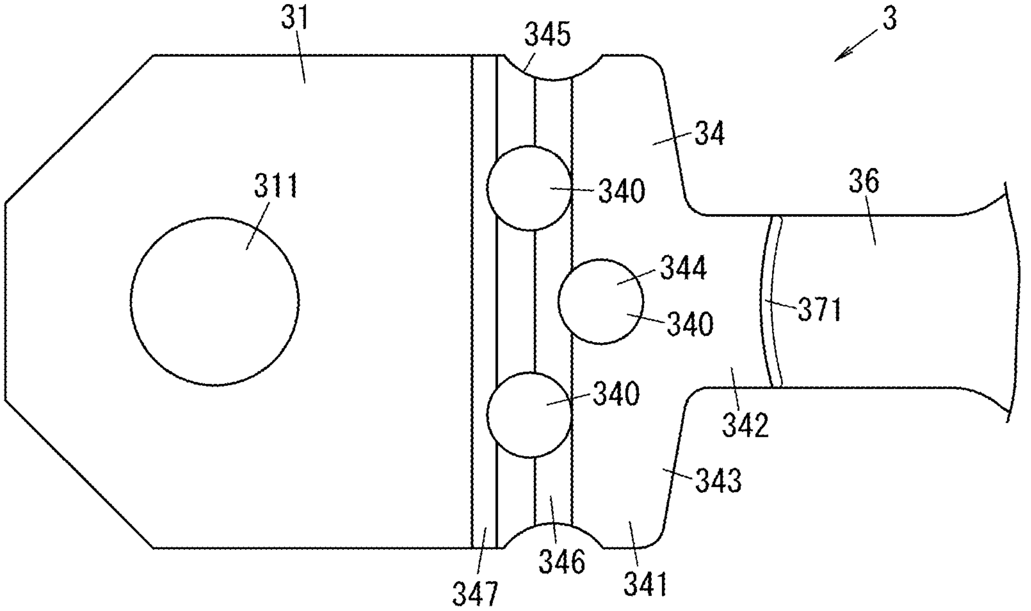
FIG. 16 is a top view of main components of a conductor included in a breaker device according to Variation 4.

In breaker device 10 according to the present variation, first holding portion 34 includes a plurality of through-holes 340, as illustrated in FIG. 16. Through-hole 344 according to the above-described exemplary embodiment is one of the plurality of through-holes 340. Note that the length of through-hole 344 is less than length L13 (refer to FIG. 9) between first terminal portion P11 and second terminal portion P12 at boundary line B1 between connecting portion 36 and first holding portion 34.

As illustrated in FIG. 16, each of the plurality of through-holes 340 is circular. Furthermore, the plurality of through-holes 340 are arranged so that the centers of all through-holes 340 do not match in the left-to-right direction (in other words, the center of at least one of through-holes 340 is offset from the center of at least another one of through-holes 340 in the left-to-right direction). If the centers of all through-holes 340 match in the left-to-right direction, a cross-sectional area of a portion of first holding portion 34 in which through-holes 340 are formed cut along a plane orthogonal to the left-to-right direction is small, which may result in reduced conduction performance at said portion. However, this is not limiting; the plurality of through-holes 340 may be arranged so that the centers of all through-holes 340 match in the left-to-right direction.

(2. 5) Variation 5

Figure 17:
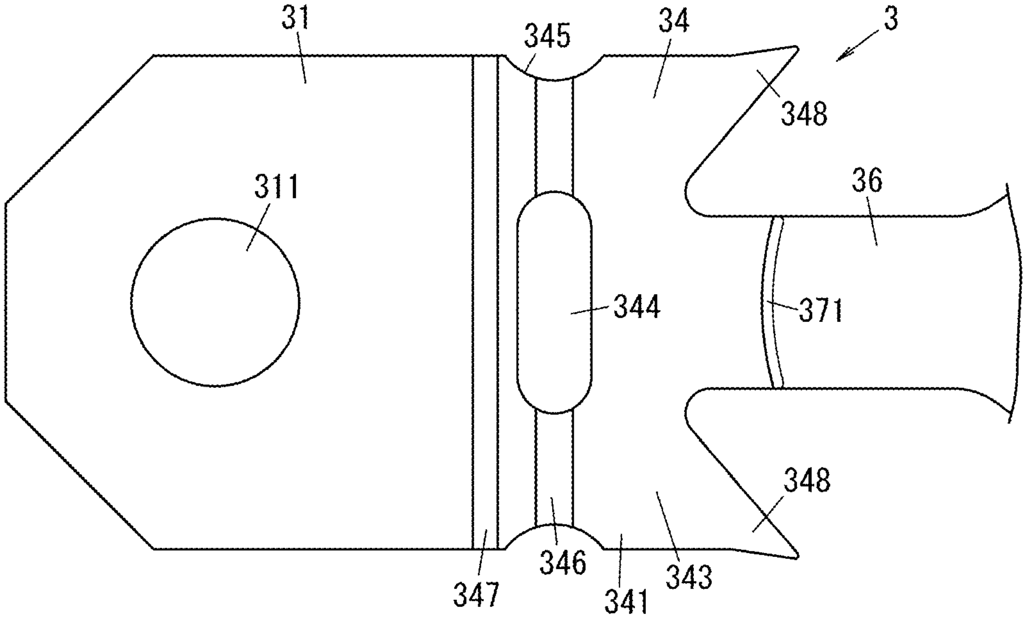
FIG. 17 is a top view of main components of a conductor included in a breaker device according to Variation 5.

In breaker device 10 according to the present variation, first holding portion 34 includes projecting portion 348, as illustrated in FIG. 17. Projecting portion 348 is embedded in resin member 4.

As illustrated in FIG. 17, first holding portion 34 includes two projecting portions 348. Each of projecting portions 348 is triangular as viewed from above. Each of projecting portions 348 protrudes to the right from a side surface (right side surface) of connecting portion 343 of first holding portion 34.

When first holding portion 34 includes projecting portions 348, the travel distance of the conductive gas that attempts to move out of casing 1 is increased similar to depressed portion 345. Thus, the gas is less likely to leak out of casing 1 and moreover, cooling of the gas is promoted. In other words, projecting portions 348 function as an arc shield structure that prevents the conductive gas attributed to the electric arc from leaking out of casing 1.

Note that second holding portion 35 may include a projecting portion similar to projecting portion 348 of first holding portion 34.

(2. 6) Variation 6

Figure 18:
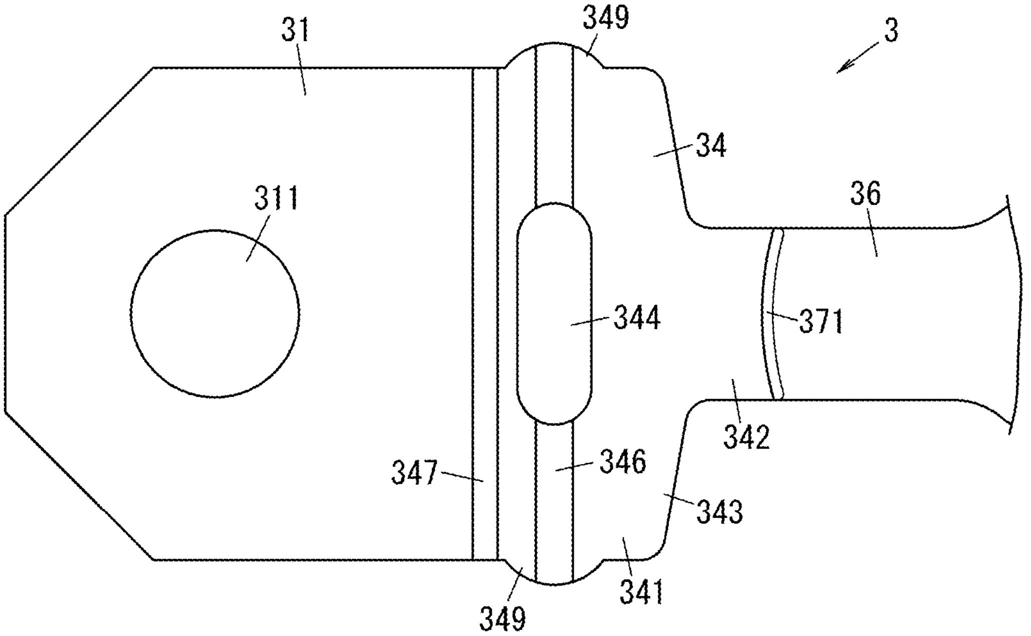
FIG. 18 is a top view of main components of a conductor included in a breaker device according to Variation 6.

In breaker device 10 according to the present variation, first holding portion 34 includes projecting portion 349, as illustrated in FIG. 18. Projecting portion 349 is embedded in resin member 4.

As illustrated in FIG. 18, first holding portion 34 includes two projecting portions 349. On a side surface (the front side surface or the back side surface) of connecting portion 343 of first holding portion 34, each of projecting portions 349 is provided instead of depressed portion 345.

When first holding portion 34 includes projecting portions 349, the travel distance of the conductive gas that attempts to move out of casing 1 is increased similar to depressed portion 345. In other words, projecting portions 349 function as an arc shield structure that prevents the conductive gas attributed to the electric arc from leaking out of casing 1.

Note that second holding portion 35 may include a projecting portion similar to projecting portion 349 of first holding portion 34.

First holding portion 34 (or second holding portion 35) may include projecting portion 349 on one side surface (for example, the front side surface) and include depressed portion 345 (or 355) on the other side surface (for example, the back side surface).

First holding portion 34 (or second holding portion 35) may include both projecting portion 348 described in Variation 5 and projecting portion 349 described in Variation 6.

First holding portion 34 and second holding portion 35 are not required to have a symmetrical shape regarding projecting portions 348, 349.

(2. 7) Variation 7

Figure 19:
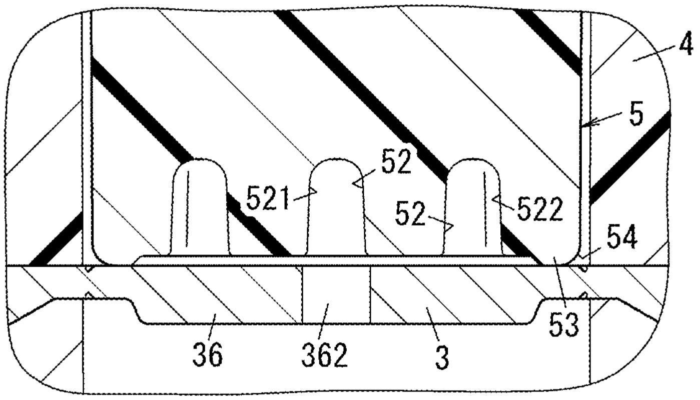
FIG. 19 is an enlarged cross-sectional view of main components of a breaker device according to Variation 7.

In breaker device 10 according to the present variation, pusher 5 includes chamfered portion 54 on the outer rim of the lower bottom surface, as illustrated in FIG. 19. Chamfered portion 54 is curved in the shape of R from the outer side surface to the lower bottom surface of pusher 5. Chamfered portion 45 is formed on support projection 53 in the present variation.

In breaker device 10 according to the present variation, pusher 5 is less likely to be damaged thanks to chamfered portion 45.

(2. 8) Variation 8

Figure 20A:
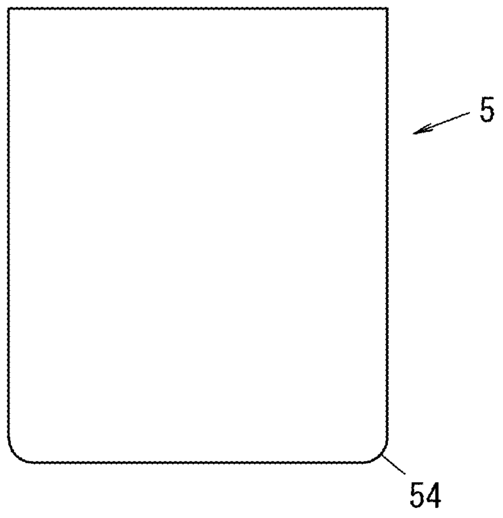
FIG. 20A is a side view of a pusher included in a breaker device according to Variation 8.
Figure 20B:
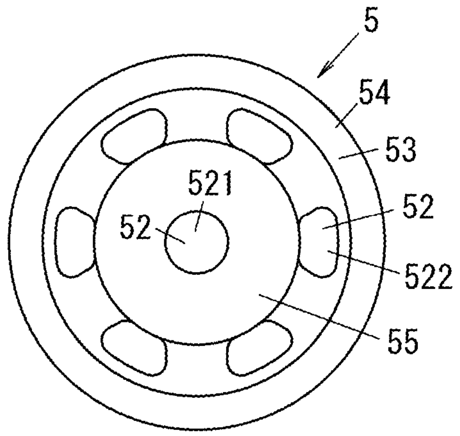
FIG. 20B is a bottom view of the pusher.

In breaker device 10 according to the present variation, pusher 5 includes, at the center of the lower bottom surface, protruding portion 55 which protrudes downward, as illustrated in FIG. 20A and FIG. 20B. Protruding portion 55 is circular as viewed from below, and a circular hole of recessed area 521 is formed at the center of protruding portion 55. Protruding portion 55 is formed at a position that does not overlap with six recessed areas 522 (inside a region surrounded by six recessed areas 522). For example, the lower surface of protruding portion 55 is flush with the lower surface of support projection 53 (is at the same position as the lower surface of support projection 53 in the up-to-down direction).

In breaker device 10 according to the present variation, as a result of including protruding portion 55, protruding portion 55 among elements of pusher 5 comes into contact with conductor 3 first during downward movement of pusher 5. Thus, the likelihood of damage to pusher 5 is reduced.

(2. 9) Other Variations

In the above-described exemplary embodiment and each of the variations, conductor 3 is formed of a single member, but this is not limiting; for example, conductor 3 may be formed of two or more members. Connecting portion 36 may be any element that electrically connects first terminal portion 31 and second terminal portion 32. For example, connecting portion 36 may include: a first fixed piece connected to first holding portion 34; a second fixed piece connected to second holding portion 35; and a movable piece that connects the first fixed piece and the second fixed piece in the left-to-right direction, and may be structured so that the movable piece is pressed against the first fixed piece and the second fixed piece by an elastic member or the like such as a spring.

In one variation, first holding portion 34 is not required to include at least one of depressed portion 345, first recessed area 346, second recessed area 347, and the plurality of grooves 38. This also applies to second holding portion 35.

In one variation, the length of first holding portion 34 of conductor 3 is not required to be greater than length L13 between first terminal portion P11 and second terminal portion P12 at boundary line B1 between connecting portion 36 and first holding portion 34. Conductor 3 may be in the shape of a flat plate having a constant front-to-back dimension, for example, as long as first holding portion 34 includes through-hole 344.

In one variation, length L11 of through-hole 344 may be less than length L13 between first terminal portion P11 and second terminal portion P12 at boundary line B1 between connecting portion 36 and first holding portion 34. For example, even when length L11 is less than length L13, the breaker device functions as the arch shield structure with which part of the gas can be prevented from moving or can be forced to bypass the area. This is also true for length L21 of through-hole 354.

In one variation, first holding portion 34 and second holding portion 35 are not required to have a symmetrical shape.

In one variation, groove 38 (or 39) is not required to have a V-shaped cross-section and may have a U-shaped cross-section, a semi-arc cross-section, or the like, for example.

(3) Aspects

As is clear from the exemplary embodiment and the variations described thus far, the following aspects are disclosed in the present specification.

A breaker device (10) according to the first aspect includes a resin member (4), an igniter (2), and a conductor (3). The resin member (4) includes an internal space (400). The igniter (2) introduces gas into the internal space (400). The conductor (3) is plate-shaped and located below the igniter (2). The conductor (3) includes: a first holding portion (34) embedded in the resin member (4); a second holding portion (35) embedded in the resin member (4); and a connecting portion (36) connecting the first holding portion (34) and the second holding portion (35). The first holding portion (34) includes a through-hole (344).

According to this aspect, a portion of the resin member (4) in which the through-hole (344) is embedded prevents movement of a conductive gas attributed to an electric arc and increases the length of the path of movement of the gas, and thus the conductive gas is less likely to leak out of the breaker device (10).

In the breaker device (10) according to the second aspect, in the first aspect, the first holding portion (34) includes a plurality of grooves (38) on an upper surface or a lower surface. Note that the plurality of grooves (38) may be provided on both the upper surface and the lower surface. The plurality of grooves (38) are embedded in the resin member (4).

According to this aspect, a portion of the resin member (4) that fills the inside of the plurality of grooves (38) prevents movement of a conductive gas attributed to an electric arc and increases the length of the path of movement of the gas, and thus the conductive gas is less likely to leak out of the breaker device (10). Furthermore, the resin member (4) fits more precisely with the conductor (3), meaning that the adhesion of the resin member (4) with the conductor (3) can be improved.

In the breaker device (10) according to the third aspect, in the second aspect, in plan view, the plurality of grooves (first grooves 381) extend in a direction (front-to-back direction) perpendicular to a direction in which the conductor (3) extends (left-to-right direction).

According to this aspect, a portion of the resin member (4) that fills the inside of the plurality of grooves (first grooves 38) prevents movement of a conductive gas attributed to an electric arc and increases the length of the path of movement of the gas, and thus the conductive gas is less likely to leak out of the breaker device (10). Furthermore, the resin member (4) fits more precisely with the conductor (3), meaning that the adhesion of the resin member (4) with the conductor (3) can be improved.

In the breaker device (10) according to the fourth aspect, in the second aspect, in plan view, the plurality of grooves (second grooves 382) extend in a direction diagonally crossing a direction in which the conductor (3) extends (left-to-right direction).

According to this aspect, a portion of the resin member (4) that fills the inside of the plurality of grooves (second grooves 382) prevents movement of a conductive gas attributed to an electric arc and increases the length of the path of movement of the gas, and thus the conductive gas is less likely to leak out of the breaker device (10). Furthermore, the resin member (4) fits more precisely with the conductor (3), meaning that the adhesion of the resin member (4) with the conductor (3) can be improved.

In the breaker device (10) according to the fifth aspect, in the second aspect, in plan view, the plurality of grooves (38) include: a first groove (381) extending in a direction (front-to-back direction) perpendicular to a direction in which the conductor (3) extends (left-to-right direction); and a second groove (382) extending in a direction diagonally crossing the direction in which the conductor (3) extends (left-to-right direction).

According to this aspect, a portion of the resin member (4) that fills the inside of the first groove (381) and the second groove (382) prevents movement of a conductive gas attributed to an electric arc and increases the length of the path of movement of the gas, and thus the conductive gas is less likely to leak out of the breaker device (10). Furthermore, the resin member (4) fits more precisely with the conductor (3), meaning that the adhesion of the resin member (4) with the conductor (3) can be improved.

In the breaker device (10) according to the sixth aspect, in any one of the second to fifth aspects, each of the plurality of grooves (38) has a V-shaped cross-section in a direction perpendicular to the direction in which the plurality of grooves (38) extend.

According to this aspect, a portion of the resin member (4) that fills the inside of the plurality of grooves (38) prevents movement of a conductive gas attributed to an electric arc and increases the length of the path of movement of the gas, and thus the conductive gas is less likely to leak out of the breaker device (10). Furthermore, the resin member (4) fits more precisely with the conductor (3), meaning that the adhesion of the resin member (4) with the conductor (3) can be improved.

In the breaker device (10) according to the seventh aspect, in any one of the first to sixth aspects, the first holding portion (34) includes a depressed portion (345) on a side surface. The depressed portion (345) is embedded in the resin member (4).

According to this aspect, a portion of the resin member (4) that fills the inside of the depressed portion (345) prevents movement of a conductive gas attributed to an electric arc and increases the length of the path of movement of the gas, and thus the conductive gas is less likely to leak out of the breaker device (10).

In the breaker device (10) according to the eighth aspect, in any one of the first to seventh aspects, the first holding portion (34) includes a projecting portion (348, 349). The projecting portion (348, 349) is embedded in the resin member 4.

According to this aspect, the projecting portion (348, 349) prevents movement of a conductive gas attributed to an electric arc and increases the length of the path of movement of the gas, and thus the conductive gas is less likely to leak out of the breaker device (10).

In the breaker device (10) according to the ninth aspect, in any one of the first to eighth aspects, the first holding portion (34) further includes a first recessed area (346) connected to the through-hole (344). The first recessed area (346) is embedded in the resin member (4).

According to this aspect, a portion of the resin member (4) that fills the inside of the first recessed area (346) prevents movement of a conductive gas attributed to an electric arc and increases the length of the path of movement of the gas, and thus the conductive gas is less likely to leak out of the breaker device (10). Furthermore, the strength of the portion of the resin member (4) that is located inside the through-hole (344) can be improved.

In the breaker device (10) according to the tenth aspect, in the ninth aspect, the first holding portion (34) further includes a second recessed area (347). The first recessed area (346) and the through-hole (344) are located between the second recessed area (347) and the connecting portion (36). The second recessed area (347) is embedded in the resin member (4).

According to this aspect, a portion of the resin member (4) that fills the inside of the second recessed area (347) prevents movement of a conductive gas attributed to an electric arc and increases the length of the path of movement of the gas, and thus the conductive gas is less likely to leak out of the breaker device (10).

In the breaker device (10) according to the eleventh aspect, in any one of the first to tenth aspects, in plan view, in a direction (front-to-back direction) perpendicular to a direction in which the conductor (3) extends (left-to-right direction), a length of the first holding portion (34) is greater than a length (L13) between a first terminal portion (P1) and a second terminal portion (P2) at a boundary line (B1) between the connecting portion (36) and the first holding portion (34), and a length (L11) of the through-hole (344) is greater than or equal to the length (L13) between the first terminal portion (P1) and the second terminal portion (P2) at the boundary line (B1) between the connecting portion (36) and the first holding portion (34).

According to this aspect, a conductive gas attributed to an electric arc needs to bypass a portion of the resin member (4) that is located inside the through-hole (344) to move out of the breaker device (10), and therefore the conductive gas is even less likely to leak out of the breaker device (10).

In the breaker device (10) according to the twelfth aspect, in any one of the first to eleventh aspects, the first holding portion (34) includes a plurality of through-holes (340). The through-hole (344) is one of the plurality of through-holes (340).

According to this aspect, a portion of the resin member (4) that fills the inside of the through-hole (340) prevents movement of a conductive gas attributed to an electric arc and increases the length of the path of movement of the gas, and thus the conductive gas is less likely to leak out of the breaker device (10).

REFERENCE SIGNS LIST

10 breaker device
2 igniter
3 conductor
34 first holding portion
340 through-hole
344 through-hole
345 depressed portion
346 first recessed area
347 second recessed area
348 projecting portion
349 projecting portion
35 second holding portion
36 connecting portion
38 groove
381 first groove
382 second groove
4 resin member
400 internal space
B1 boundary line
L11 length
L13 length
P11 first terminal portion
P12 second terminal portion

The invention claimed is:

1. A breaker device comprising:

a resin member including an internal space;

an igniter configured to introduce gas into the internal space; and a conductor that is plate-shaped and located below the igniter, wherein the conductor includes:

a first holding portion embedded in the resin member;

a second holding portion embedded in the resin member; and a connecting portion connecting the first holding portion and the second holding portion, the first holding portion includes a through-hole, the first holding portion further includes a first recessed area connected to the through-hole, the first recessed area is embedded in the resin member, and a part of the resin member is disposed at an inside of the through-hole.

2. The breaker device according to claim 1, wherein the first holding portion includes a plurality of grooves on an upper surface or a lower surface, and the plurality of grooves are embedded in the resin member.

3. The breaker device according to claim 2, wherein in plan view, the plurality of grooves extend in a direction perpendicular to a direction in which the conductor extends.

4. The breaker device according to claim 2, wherein in plan view, the plurality of grooves extend in a direction diagonally crossing a direction in which the conductor extends.

5. The breaker device according to claim 2, wherein in plan view, the plurality of grooves include:

a first groove extending in a direction perpendicular to a direction in which the conductor extends; and a second groove extending in a direction diagonally crossing the direction in which the conductor extends.

6. The breaker device according to claim 2, wherein each of the plurality of grooves has a V-shaped cross-section in a direction perpendicular to the direction in which the plurality of grooves extend.

7. The breaker device according to claim 1, wherein the first holding portion includes a depressed portion on a side surface, and the depressed portion is embedded in the resin member.

8. The breaker device according to claim 7, wherein the first holding portion further includes a second recessed area, the first recessed area and the through-hole are located between the second recessed area and the connecting portion, and the second recessed area is embedded in the resin member.

9. The breaker device according to claim 7, wherein in plan view, in a direction perpendicular to a direction in which the conductor extends, a length of the first holding portion is greater than a length between a first terminal portion and a second terminal portion at a boundary line between the connecting portion and the first holding portion, and a length of the through-hole is greater than or equal to the length between the first terminal portion and the second terminal portion at the boundary line between the connecting portion and the first holding portion.

10. The breaker device according to claim 1, wherein the first holding portion includes a projecting portion, and the projecting portion is embedded in the resin member.

11. The breaker device according to claim 1, wherein the first holding portion further includes a second recessed area, the first recessed area and the through-hole are located between the second recessed area and the connecting portion, and the second recessed area is embedded in the resin member.

12. The breaker device according to claim 1, wherein in plan view, in a direction perpendicular to a direction in which the conductor extends, a length of the first holding portion is greater than a length between a first terminal portion and a second terminal portion at a boundary line between the connecting portion and the first holding portion, and a length of the through-hole is greater than or equal to the length between the first terminal portion and the second terminal portion at the boundary line between the connecting portion and the first holding portion.

13. The breaker device according to claim 1, wherein the first holding portion includes a plurality of through-holes, and the through-hole is one of the plurality of through-holes.

14. The breaker device according to claim 1, wherein the part of the resin member disposed at the inside of the through-hole connects an upper part of the resin member disposed above the first holding portion and a lower part of the resin member disposed below the first holding portion.

15. The breaker device according to claim 1, wherein an another part of the resin member is disposed at an inside of the first recessed area.

16. A breaker device comprising:

a resin member including an internal space;

an igniter configured to introduce gas into the internal space;

a conductor that is plate-shaped and located below the igniter, wherein:

the conductor includes:

a first holding portion embedded in the resin member;

a second holding portion embedded in the resin member;

a connecting portion connecting the first holding portion and the second holding portion; and a separation groove provided between the first holding portion and the connecting portion and on at least one of an upper surface or a lower surface of the conductor, the first holding portion includes a through-hole, and a first recessed area connected to the through-hole, the first recessed area is embedded in the resin member, the separation groove is not embedded in the resin member, and the resin member includes a first part disposed on a first surface of the first holding portion, a second part disposed on a second surface of the first holding member opposite to the first surface and a third part disposed at an inside of the through-hole and connecting the first part and the second part.

17. The breaker device according to claim 16, wherein the first holding portion includes a plurality of grooves on an upper surface or a lower surface, the plurality of grooves are embedded in the resin member, and in plan view, the plurality of grooves extend in a direction diagonally crossing a direction in which the conductor extends.

18. The breaker device according to claim 16, wherein the first holding portion includes a plurality of grooves on an upper surface or a lower surface, the plurality of grooves are embedded in the resin member, and in plan view, the plurality of grooves include:

a first groove extending in a direction perpendicular to a direction in which the conductor extends; and a second groove extending in a direction diagonally crossing the direction in which the conductor extends.

19. The breaker device according to claim 16, wherein the first holding portion further includes a second recessed area, the first recessed area and the through-hole are located between the second recessed area and the connecting portion, and the second recessed area is embedded in the resin member.

20. The breaker device according to claim 16, wherein in plan view, in a direction perpendicular to a direction in which the conductor extends, a length of the first holding portion is greater than a length between a first terminal portion and a second terminal portion at a boundary line between the connecting portion and the first holding portion, and a length of the through-hole is greater than or equal to the length between the first terminal portion and the second terminal portion at the boundary line between the connecting portion and the first holding portion.

* * * * *